(12) United States Patent
Sharangpani et al.

(10) Patent No.: US 7,464,254 B2
(45) Date of Patent: Dec. 9, 2008

(54) PROGRAMMABLE PROCESSOR APPARATUS INTEGRATING DEDICATED SEARCH REGISTERS AND DEDICATED STATE MACHINE REGISTERS WITH ASSOCIATED EXECUTION HARDWARE TO SUPPORT RAPID APPLICATION OF RULESETS TO DATA

(75) Inventors: Harshvardhan Sharangpani, Santa Clara, CA (US); Manoj Khare, Saratoga, CA (US); Kent Fielden, Sunnyvale, CA (US); Rajesh Patil, Santa Clara, CA (US); Judge Kennedy Arora, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 836 days.

(21) Appl. No.: 10/755,188

(22) Filed: Jan. 8, 2004

(65) Prior Publication Data

US 2004/0215593 A1 Oct. 28, 2004

Related U.S. Application Data

(60) Provisional application No. 60/438,847, filed on Jan. 9, 2003.

(51) Int. Cl.
*G06F 7/00* (2006.01)
(52) U.S. Cl. ........................ 712/300; 712/220
(58) Field of Classification Search .................. 712/220, 712/300
See application file for complete search history.

(56) References Cited

U.S. PATENT DOCUMENTS

| 4,550,436 A | 10/1985 | Freeman et al. |
| 4,760,523 A | 7/1988 | Yu et al. |
| 4,965,472 A | 10/1990 | Anderson |
| 5,050,075 A | 9/1991 | Herman et al. |
| 5,051,947 A | 9/1991 | Messenger et al. |

(Continued)

FOREIGN PATENT DOCUMENTS

EP 0 488 297 A2 6/1992

(Continued)

OTHER PUBLICATIONS

Danield Jurafsky and James H. Martin, "Speech and Language Processing: An Introduction to Natural Language Processing, Computational Liguistics, and Speech Recognition," Prentice Hall Inc., pp. i-xxvi and 1-90 (2000).

(Continued)

*Primary Examiner*—Eric Coleman
(74) *Attorney, Agent, or Firm*—Blakely, Sokoloff, Taylor & Zafman LLP

(57) ABSTRACT

A rule processor and method for using the same are disclosed. In one embodiment, the rule processor comprises a general purpose register file, an instruction sequencer to provide instructions, a decoder coupled to the general purpose register file to decode a set of instructions specified by the instruction sequencer, and a state machine unit coupled to the decoder and having state machine registers to store one or more state machines and state machine execution hardware coupled to the state machine registers to evaluate the one or more state machines in response to executing one or more of the set of instructions and based on information from one or both of the decoder and the general purpose register file.

25 Claims, 20 Drawing Sheets

U.S. PATENT DOCUMENTS

| | | | |
|---|---|---|---|
| 5,060,143 A | | 10/1991 | Lee |
| 5,101,376 A | | 3/1992 | Noguchi et al. |
| 5,163,016 A | | 11/1992 | Har'El et al. |
| 5,452,451 A | | 9/1995 | Akizawa et al. |
| 5,497,488 A | | 3/1996 | Akizawa et al. |
| 5,586,288 A | | 12/1996 | Dahlberg |
| 5,619,718 A | * | 4/1997 | Correa .......................... 704/9 |
| 5,623,680 A | | 4/1997 | Flora-Holmquist et al. |
| 5,649,149 A | * | 7/1997 | Stormon et al. ............. 711/108 |
| 5,822,608 A | | 10/1998 | Dieffenderfer et al. |
| 5,905,902 A | | 5/1999 | O'Connor |
| 5,949,251 A | | 9/1999 | Chambers |
| 5,974,525 A | * | 10/1999 | Lin et al. ...................... 712/23 |
| 6,070,252 A | * | 5/2000 | Xu et al. ....................... 714/30 |
| 6,212,625 B1 | * | 4/2001 | Russell ...................... 712/217 |
| 6,253,112 B1 | | 6/2001 | Flora-Holmquist et al. |
| 6,266,634 B1 | | 7/2001 | Buchsbaum et al. |
| 6,269,189 B1 | | 7/2001 | Chanod |
| 6,327,508 B1 | * | 12/2001 | Mergard ........................ 700/5 |
| 6,380,924 B1 | | 4/2002 | Yee et al. |
| 6,700,809 B1 | * | 3/2004 | Ng et al. ....................... 365/49 |
| 6,742,107 B2 | * | 5/2004 | Jinzaki ....................... 712/200 |
| 6,952,694 B2 | * | 10/2005 | Mathur et al. .................. 707/6 |
| 7,085,918 B2 | | 8/2006 | Sharangpani et al. |
| 7,119,577 B2 | | 10/2006 | Sharangpani |
| 2002/0087537 A1 | | 7/2002 | Evans |
| 2003/0120480 A1 | | 6/2003 | Mohri et al. |
| 2003/0125931 A1 | | 7/2003 | Campbell |
| 2003/0194223 A1 | | 10/2003 | Kim |
| 2004/0059443 A1 | | 3/2004 | Sharangpani |
| 2005/0012521 A1 | | 1/2005 | Sharangpani |

FOREIGN PATENT DOCUMENTS

| | | |
|---|---|---|
| WO | WO 94/19757 | 9/1994 |
| WO | WO 2004/021181 A2 | 3/2004 |
| WO | PCT/US2004/000409 | 6/2004 |
| WO | WO 2004/063886 A2 | 7/2004 |

OTHER PUBLICATIONS

Alfred V. Aho, et al., "Compilers: Principles, Techniques, and Tools," Addison-Wesley Publishers, pp. i-x, and 83-278 (Mar. 1988).

T. Matoba, et al., "A Rapid Turnaround Design of a High Speed VLSI Search Processor," Integration, the VLSI Journal, vol. 10, No. 3, pp. 319-337 (Feb. 10, 1997).

PCT Notification of Transmittal of The International Search Report or The Declaration for PCT Counterpart Application No. PCT/US03/27518 Containing International Search Report, 6 pgs. (Nov. 4, 2004).

* cited by examiner

Example pseudo-code and Rule Engine micro-code

Pseudo-code 1201

FIND ((("cp /bin/sh /usr/spool/mail/root" *BEFORE* "chmod 4755 !$") *AND* "touch") *BEFORE* "mail"

Micro-code for an exemplary Rule Engine

| | Opcode | Pattern | Mask | Start Offset | Start Offset Indirect | End Offset | End Offset Indirect | Result Register | Branch Address |
|---|---|---|---|---|---|---|---|---|---|
| 1 | FIND_FIRST_FORWARD | "cp /bin/" | 0xFF | 0x03D | 0 | 0x800 | 0 | A | 0xB |
| 2 | FIND_FORWARD_ANCHORED | "sh /usr/" | 0xFF | <A + 8> | 1 | 0x800 | 0 | A | 0xB |
| 3 | FIND_FORWARD_ANCHORED | "spool/ma" | 0xFF | <A + 8> | 1 | 0x800 | 0 | A | 0xB |
| 4 | FIND_FORWARD_ANCHORED | "il/root" | 0xFE | <A + 8> | 1 | 0x800 | 0 | A | 0xB |
| 5 | FIND_FIRST_FORWARD | "chmod 47" | 0xFF | <A + 7> | 1 | 0x800 | 0 | A | 0xB |
| 6 | FIND_FORWARD_ANCHORED | "55 !$" | 0xF8 | <A + 8> | 1 | 0x800 | 0 | A | 0xB |
| 7 | FIND_FIRST_FORWARD | "touch" | 0xF8 | 0x03D | 0 | 0x800 | 0 | B | 0xB |
| 8 | CMP(B+5, A+5)_BRANCH(10) | - | - | - | - | - | - | - | 0xA |
| 9 | FIND_FIRST_FORWARD | "mail" | 0xF0 | <A + 5> | 1 | 0x800 | 0 | C | 0xB |
| 10 | FIND_FIRST_FORWARD | "mail" | 0xF0 | <B + 5> | 1 | 0x800 | 0 | C | 0xB |

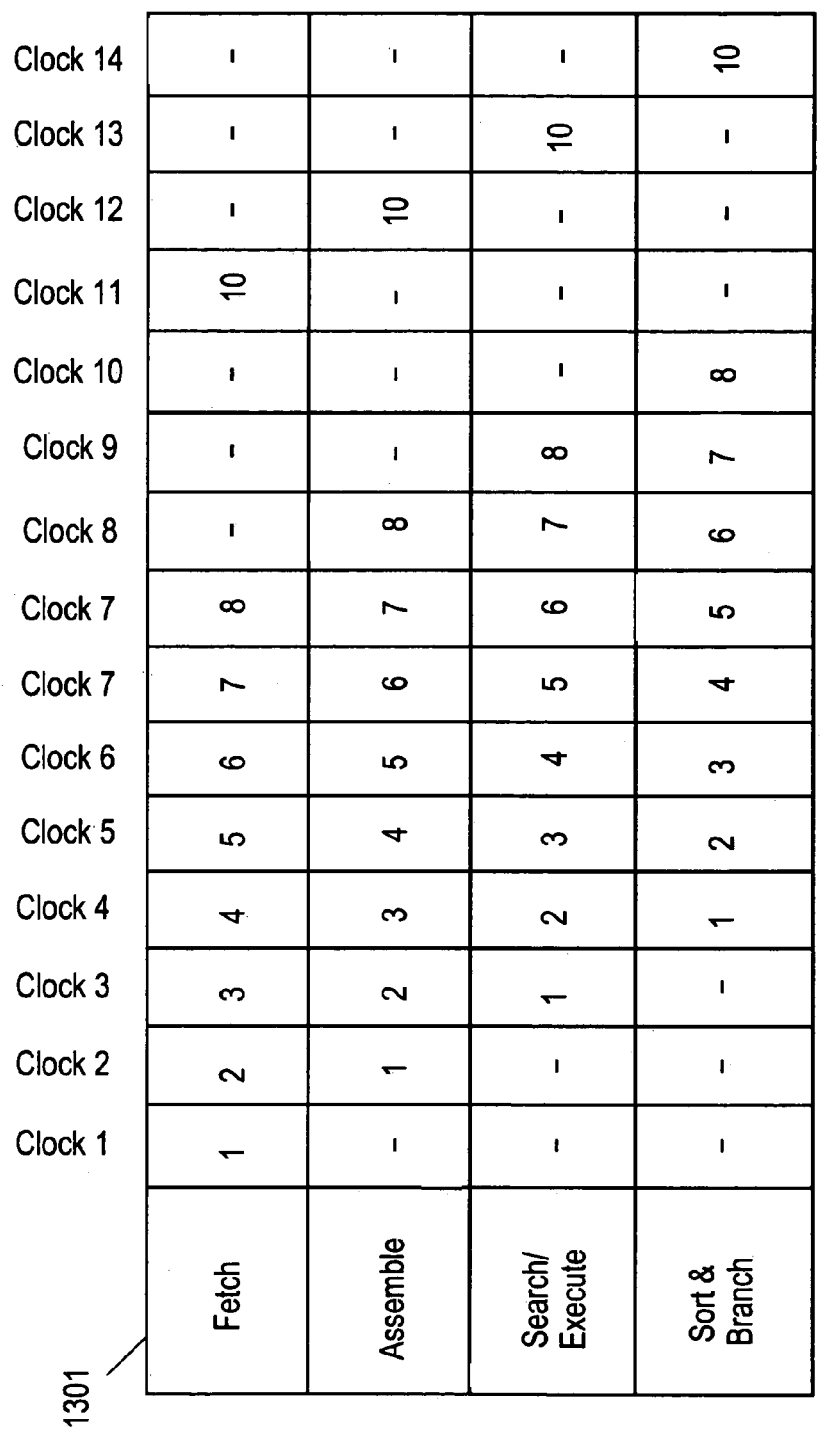

PROGRAMMABLE PROCESSOR APPARATUS INTEGRATING DEDICATED SEARCH REGISTERS AND DEDICATED STATE MACHINE REGISTERS WITH ASSOCIATED EXECUTION HARDWARE TO SUPPORT RAPID APPLICATION OF RULESETS TO DATA

This application is a non-provisional application of U.S. Provisional Patent Application Ser. No. 60/438,847, filed Jan. 9, 2003, which is incorporated herein by reference.

RELATED APPLICATIONS

The present application is related to U.S. patent application Ser. No. 10/650,363 entitled "Programmable Rule Processing Apparatus for Conducting High Speed Contextual Searches and Characterizations of Patterns in Data," filed on Aug. 27, 2003; U.S. patent application Ser. No. 10/650,364 entitled "Method and Apparatus for Efficient Implementation and Evaluation of State Machines and Programmable Finite State Automata," filed on Aug. 27, 2003; and U.S. patent application Ser. No. 10/755,048 entitled "METHODS AND APPARATUSES FOR EVALUATION OF REGULAR EXPRESSIONS OF ARBITRARY SIZE," concurrently filed with this application, the entire contents of which are hereby incorporated by reference.

FIELD OF THE INVENTION

The present invention relates to the field of information processing, specifically the field of content analytics and processing.

BACKGROUND OF THE INVENTION

Significant trends in computing and communications are leading to the emergence of environments that abound in content analytics and processing. These environments require high performance as well as programmability on a certain class of functions, namely searching, parsing, analysis, interpretation, and transformation of content in messages, documents, or packets. Notable fields that stress such rich content analytics and processing include content-aware networking, content-based security systems, surveillance, distributed computing, wireless communication, human interfaces to computers, information storage and retrieval systems, content search on the semantic web, bio-informatics, and others.

The field of content-aware networking requires searching and inspection of the content inside packets or messages in order to determine where to route or forward such packages and messages. Such inspection has to be performed on in-flight messages at "wire-speed", which is the data-rate of the network connection. Given that wire rates in contemporary networks range from 100 Mbits/second all the way to 40 Gbits/second, there is tremendous pressure on the speed at which the content inspection function needs to be performed.

Content-based security systems and surveillance and monitoring systems are required to analyze the content of messages or packets and apply a set of rules to determine whether there is a security breach or the possibility of an intrusion. Typically, on modern network intrusion detection systems (NIDS), a large number of patterns, rules, and expressions have to be applied to the input payload at wire speed to ensure that all potential system vulnerabilities are uncovered. Given that the network and computing infrastructure is continuously evolving, fresh vulnerabilities continue to arise. Moreover, increasingly sophisticated attacks are employed by intruders in order to evade detection. Intrusion detection systems need to be able to detect all known attacks on the system, and also be intelligent enough to detect unusual and suspicious behavior that is indicative of new attacks. All these factors lead to a requirement for both programmability as well as extremely high performance on content analysis and processing.

With the advent of distributed and clustered computing, tasks are now distributed to multiple computers or servers that collaborate and communicate with one another to complete the composite job. This distribution leads to a rapid increase in computer communication, requiring high performance on such message processing. With the emergence of XML (Extensible Markup Language) as the new standard for universal data interchange, applications communicate with one another using XML as the "application layer data transport". Messages and documents are now embedded in XML markup. All message processing first requires that the XML document be parsed and the relevant content extracted and interpreted, followed by any required transformation and filtering. Since these functions need to be performed at a high message rate, they become computationally very demanding.

With the growth of untethered communication and wireless networks, there is an increase in the access of information from the wireless device. Given the light form factor of the client device, it is important that data delivered to this device be filtered and the payload be kept small. Environments of the future will filter and transform XML content from the wireline infrastructure into lightweight content (using the Wireless Markup Language or WML) on the wireless infrastructure. With the increasing use of wireless networks, this content transformation function will be so common that an efficient solution for it's handling will be needed.

Another important emerging need is the ability to communicate and interact with computers using human interfaces such as speech. Speech processing and natural language processing is extremely intensive in content searching, lexical analysis, content parsing, and grammar processing. Once a voice stream has been transduced into text, speech systems need to apply large vocabularies as well as syntactic and semantic rules on the incoming text stream to understand the speech.

The emergence and growth of the worldwide web has placed tremendous computational load on information retrieval (IR) systems. Information continues to be added to the web at a high rate. This information typically gets fully indexed against an exhaustive vocabulary of words and is added to databases of search engines and IR systems. Since information is continuously being created and added, indexers need to be "always-on". In order to provide efficient real-time contextual search, it is necessary that there be a high performance pattern-matching system for the indexing function.

Another field that stresses rich content analytics and processing is the field of bio-informatics. Gene analytics and proteomics entail the application of complex search and analysis algorithms on gene sequences and structures. Once again, such computation requires high performance search, analysis, and interpretation capability.

Thus, emerging computer and communications environments of the future will stress rich analysis and processing of content. Such environments will need efficient and programmable solutions for the following functions—searching, lexical analysis, parsing, characterization, interpretation, filtering and transformation of content in documents, messages, or packets.

Central to these rich content processing functions are (1) operations to perform contextual and content-based search, lookup, navigation, and rich associative lookup, and (2) the capability to efficiently evaluate state machines against an input data stream.

In the prior art, search and lookup processing has typically has been performed in one of two ways. First, such processing has been performed using fixed application specific integrated circuits (ASIC) solutions using a combination of content addressable memories (CAMs), comparator hardware and dedicated logic. For example, search rules are stored in a content-addressable memory, and the data is streamed across the structure, shifting it 1 byte or 1 word at a time. Alternatively, specific comparators are arranged at fixed locations to recognize specific values in the incoming data. Incidences of matches are recorded and consumed by the dedicated logic as per the requirements of the target application. Although the fixed ASIC approach can increase performance, it lacks easy programmability, and hence its application is severely restricted. Furthermore, the expense associated with designing and tailoring specific chips for each targeted solution is prohibitive.

Second, traditional general-purpose microprocessors with general-purpose execution datapaths have been used to handle rich search and lookup functions and associated content processing. Microprocessors are fully programmable devices and are able to address the evolving needs of problems—by simply reprogramming the software the new functionality can be redeployed. However, the traditional microprocessor is limited in the performance level it can offer to rich content analytics and processing.

The limitation in performance on content analytics is inherent in the design and evolution of the microprocessor architecture. The microprocessor originated as a computing unit, performing arithmetic operations on 1,2,4,8 byte words. Subsequently, as the field of computing evolved, more functionality was progressively added to the microprocessor to address emerging fields. As a result, the general purpose microprocessor is functional across a very wide range of applications, but not very well tuned for any one in particular. Fundamentally, as it applies to the needs of content analytics, the microprocessor architecture has two key limitations—(1) it lacks the capability to simultaneously perform massively parallel and fine-grain pattern-matching and comparison operations on large datasets, and (2) it lacks the capability to make rapid and multiple state transitions and efficient multi-directional control flow changes based on input data.

A number of search and pattern matching algorithms have evolved to make best use of the microprocessor. The Boyer-Moore algorithm is widely regarded as one of the best-known techniques employed on a microprocessor to find occurrences of patterns in a given data set. The algorithm processes only one pattern at a time and must be repeatedly invoked if more than one pattern is to be searched in a data set. For each pattern to be searched, it advances sequentially through the data set making selective comparisons based on observations obtained from pre-characterizing the pattern. This algorithm provides superior performance relative to other pattern matching algorithms by reducing the total number of comparisons within a given data set. However, due to the sequential nature of the algorithm, the performance is limited by fundamental constraints of microprocessor architecture, namely the scalar instruction set and the penalty incurred on branching.

Owing to the aforementioned architectural limitations of the microprocessor, the efficiency and capability of conventional microprocessors are severely challenged by the emerging computing and communications environments described earlier. Several data points can be provided to support these arguments. For example, in a Network Intrusion Detection System (NIDS) such as Snort, it is already desirable to apply signature detection of hundreds of strings on incoming packets. Performing this workload with signatures of 8-byte patterns on a 3 GHz Pentium IV processor in a commercial microprocessor-based system that employs an improved version of the Boyer-Moore pattern matching algorithm limits the packet rate to less than 50 Mbps. Likewise, parsing of XML documents on such a platform is limited to the 10 MB/s range, and speech processing is limited to 1 real-time stream on restricted grammars and vocabularies. These data points indicate that the conventional microprocessor of 2003 or 2004 will be able to deliver rich content analytics and processing at rates around the 100 Mbps range. However, by that timeframe, data rates of between 1 Gbps to 10 Gbps will not be uncommon in enterprise networks and environments. Clearly, there is a severe mismatch of one to two orders of magnitude between the performance that can be delivered by the conventional microprocessor and that which is demanded by the environment. While it is possible to employ multiple parallel microprocessor systems to execute some of the desired functions at the target rate, this greatly increases the cost of the system. There is clearly a need for a more efficient solution for these target functions.

A similar parallel exists in the case of state machine evaluation. The history of state machines dates back to early computer science. In their simplest formulation, state machines are formal models that consist of states, transitions amongst states, and an input representation. Starting with Turing's model of algorithmic computation (1936), state machines have been central to the theory of computation. In the 1950s, the regular expression was developed by Kleene as a formal notation to describe and characterize sets of strings. The finite state automaton was developed as a state machine model that was found to be equivalent to the regular expression. Non-deterministic automata were subsequently developed and proven to be equivalent to deterministic automata. Subsequent work by Thompson and others led to a body of construction algorithms for constructing finite state automata to evaluate regular expressions. A large number of references are available for descriptions of Regular Expressions and Finite State Automata. For a reference text on the material, see "Speech and Language Processing" (by Daniel Jurafsky and James H. Martin, Prentice-Hall Inc, 2000).

Using techniques available in the prior art, state machine and finite state automata processing can be performed in one of three ways. First, such processing has been performed using fixed application specific integrated circuits (ASIC) solutions that directly implement a fixed and chosen state machine that is known apriori. Although the fixed ASIC approach can increase performance, it lacks programmability, and hence its application is severely restricted. Furthermore, the expense associated with designing and tailoring specific chips for each targeted solution is prohibitive.

Second, Field Programmable Gate Arrays (FPGA) can be used to realize state machines in a programmable manner. Essentially, the FPGA architecture provides generalized programmable logic that can be configured for a broad range of applications, rather than being specially optimized for the implementation of state machines. Using this approach, one can only accommodate a small number of state machines on a chip, and furthermore the rate at which evaluation can progress is limited. The density and performance characteristics of the implementations make this choice of solution inadequate for the broad range of emerging applications.

Third, traditional general-purpose microprocessors have been used to implement a variety of state machines. Microprocessors are fully programmable devices and are able to address the evolving needs of problems—by simply reprogramming the software the new functionality can be redeployed. However, the traditional microprocessor is limited in the efficiency with which it can implement and evaluate state machines.

There is a need for a new solution for a programmable processing apparatus that is more suitable for content analytics and processing, and that is efficient on a set of functions that include state machine evaluation as well as the execution of operations for contextual search, lexical analysis, parsing, interpretation, and transformation of content on messages, packets, or documents.

SUMMARY OF THE INVENTION

A rule processor and method for using the same are disclosed. In one embodiment, the rule processor comprises a general purpose register file, an instruction sequencer to provide instructions, a decoder coupled to the general purpose register file to decode a set of instructions specified by the instruction sequencer, and a state machine unit coupled to the decoder and having state machine registers to store one or more state machines and state machine execution hardware coupled to the state machine registers to evaluate the one or more state machines in response to executing one or more of the set of instructions and based on information from one or both of the decoder and the general purpose register file.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 12 illustrates an example pseudo-code of a complex pattern matching rule-set and the corresponding micro-code for an exemplary rule-processor.

FIG. 13 illustrates the clock-by-clock pipelined execution of the micro-code shown in FIG. 12.

DETAILED DESCRIPTION OF THE PRESENT INVENTION

Figure 1:
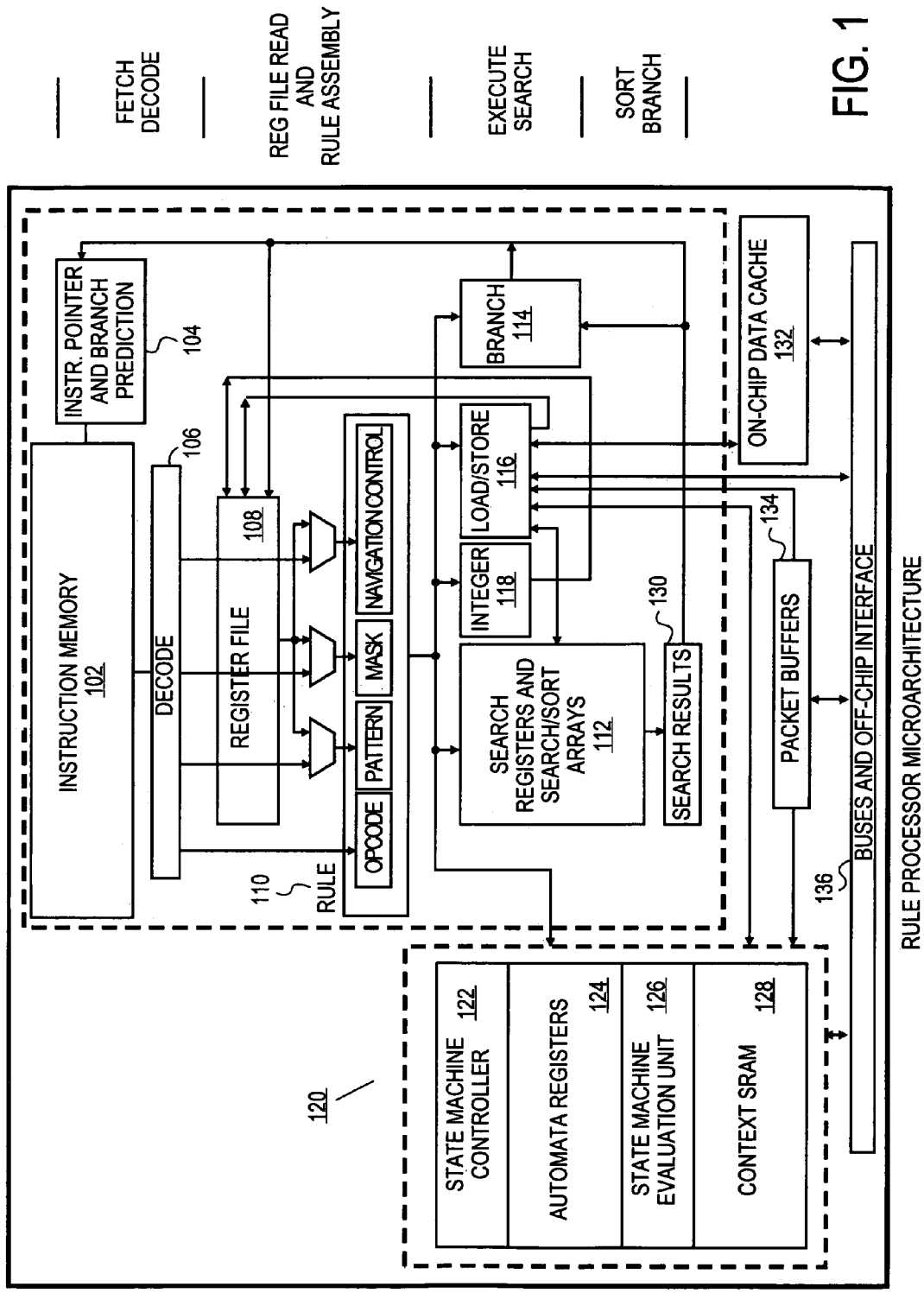
FIG. 1 is a block diagram of a rule processor.

A programmable rule processor apparatus integrating dedicated search registers and dedicated state machine registers with execution hardware to support rapid application of rulesets and grammars to data is described. Such a processor may be used for content analysis and searches. In one embodiment, the programmable rule processor includes portions or apparatus typically found in a general purpose processor along with search registers coupled with a search/parse execution array and also state machine registers coupled with state machine evaluation units. The portions of a general purpose processor may includes the use of an instruction (or rule) memory, instruction pointer and instruction sequencer, as well as a decoder and general purpose register file. Other portions may be used and will be described in more detail below.

In one embodiment, the search registers store data or content in an array and the general purpose processor front end presents rules to the array for executing searches. The content may be a packet, stream, message or a document. The search registers and search/parse execution array allow for parallel and recursive sequencing of rules against the content payload, as well as parallel pattern matching capability and the capability of making multiple rapid content-based state transitions. Operations such as, for example, pattern matching, lexical analysis, parsing and interpretation functions, may be performed.

In contrast, in one embodiment, the state machine registers and state machine evaluation engines operate in an inverse fashion by storing rules programmed into the state machine registers and by streaming data through them. Note that for the discussion herein the terms state machine registers, automata registers and expression registers may be used interchangeably.

The coupling of the search registers and the search/parse array with the state machine registers and evaluation logic using a generalized sequencer and an instruction set format provide for a powerful programmable rule processor that accelerates rule-processing functions through dedicated and tailored hardware, and that allows a rich mix of operations to be performed in a single integrated processor apparatus. By integrating dedicated search registers and associated search/parse execution hardware with the general purpose processor apparatus, the associative search and lookup functionality can be accelerated efficiently, and yet a rich mix of general purpose operations can be simultaneously performed. Likewise, by integrating state machine registers and associated state machine execution hardware with the general purpose processor apparatus, the state machine evaluation functionality can be accelerated, and simultaneously, a rich mix of general purpose functions can be performed on the data. The integration of all three pieces of apparatus—search registers and search execution hardware, state machine registers and state machine evaluation hardware, and general purpose processor hardware, yields a powerful programmable rule processor solution. Data can be fed into the rule processor and a mix of search functions, state machine evaluation functions as well as general purpose programming functions can be simultaneously performed. The state machine hardware and the search hardware can be viewed as another dedicated resource in the rule processor. A variety of operations can be performed on the data, which can be both analyzed and transformed progressively. In one embodiment, the various functional operations that can be performed in this rule processor can be performed in any sequence or order, and also in parallel, leading to accelerated content analysis and transformation capability.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A programmable rule processor is disclosed that comprises a general purpose processor portion having general purpose registers, a general purpose execution data path attached thereto, and an instruction sequencer. The general purpose processor portion is a tightly coupled with search registers with search execution units and state machine registers with state machine execution units. Together the search registers with search execution units and together the state machine recognition units the state machine execution units may each be considered processor execution units much like a floating point unit and an integer unit are execution units in a general purpose processor. Based on the type of instruction (e.g., opcode), a decoder in the general purpose processor portion is able to direct instructions to either of these execution blocks.

The general purpose processor portion feeds data and rules to the search registers and the state machine registers and is able to receive results from either one and supply them to the other or to both. That is, the general purpose processor portion is integrated with the search registers and the state machine registers such that the general purpose processor portion can access all the data in the search registers and the state machine registers, as well as move data between the search registers, and the state machine register, and the general purpose registers.

The general purpose processor portion also includes a (rule) instruction memory to store instructions, a instruction sequencer, including an instruction pointer, to sequence through a set of instructions stored in the instruction memory, a decoder to decode each instruction. The decoder is able to examine the instructions fed to it and to obtain search parameters and operands or retrieve indexes to locations in a general purpose register file that store such parameters and operands. Thus, the decoder decodes the instructions and then assembles the operands and parameters and prepares the rules that will be presented to the various rule processing execution units.

FIG. 1 is a block diagram of one embodiment of a programmable rule processor. The programmable rule processor integrates traditional microprocessor capability with grammar processing, expression processing and string matching capabilities. Simple string matching is provided by search registers and a search/parse array that search for a set of bytes. The expression processing is provided by state machine hardware that detects and processes combinations of multiple strings and operators. The grammar processing is achieved by the combined use of these two pieces of specialized hardware along with the general purpose processor to perform contextual and progressive parsing by applying a tree of rules and expressions, resulting in a contextual search with complex control flow.

Thus, the programmable processor of the present invention integrates parallel pattern matching, contextual search, navigation and progressive rule analysis, state machine hardware and elements of a conventional processor (e.g., integer, load/store, associative lookup, branching).

Referring to FIG. 1, the instructions are stored in an instruction memory 102. Instructions are selected by flow control using an instruction fetch pointer and branch prediction unit 104. The instruction pointer points to locations in instruction memory 102 from which instructions are to be fetched. This occurs during the fetch stage of the hardware pipeline. Instruction fetch pointer and branch prediction unit 104 operate in a manner well known in the art to sequence instructions to decoder 106.

Decoder 106 reads and decodes instructions during a decoding stage. As far as decoded instructions for rule processing by the search registers and search hardware is concerned, the results from decoder 106 include an identification of the opcode, pattern, mask and navigation control (e.g., windows of where to begin and end searching) for each rule, such as instruction 110, or an indication of where in the general purpose register file 108 such information is stored. The instruction format is expanded to specify rules for searching and analysis of data. Note that other instruction formats may be used. After reading from register file 108, the values can be used to incorporate or write specific values into various fields of a rule that is being assembled.

As far as decoded instructions for rule processing by the state machine apparatus is concerned, the results from the decoder include an identification of the opcode, the input data values or a pointer to where the data values reside (either in general purpose register 108, or in packet buffers 134, or in an external address), as well as a code or indication as to which of state machine registers 124 and state machine units need to be invoked.

Next, the parameters of each instruction are supplied by decoder 106 to state machine unit 120, search registers & search/sort arrays 112, integer (or other arithmetic logic unit (ALU)) unit 118, load/store unit 116, and branch unit 114. In another embodiment, this is done with an instruction sequencer unit, which acts both as an instruction sequencer and a decoder.

Load/store unit 16 loads values into or stores values from the search registers as well as state machine registers 124 as well as streams data into the state machine unit 120.

The instructions may specify rules for searching and analysis of data. In such a case, the rule is presented to the search registers of search registers & search/sort arrays 112. The search execution hardware finds the specified pattern in the search registers, if it exists. Sort array sorts and delivers the desired match location and match results and completes execution of the search(es). Results of the searching are sent to search results storage 130.

More specifically, search registers & search/sort arrays 112 comprises search register and a sorter. These will be described in more detail below. The search register stores searchable data, which may be content from a document, message, packet, or any other well-known source of data that can undergo searching. The size of the search register may be arbitrary, and in one embodiment is organized within a larger array, called a search array having multiple rows of a predetermined number of bytes each. Data from search register is stored in a replicated manner inside the search array. Irrespective of the manner in which the searchable data is organized throughout the search array, the search array receives a pattern and mask from rule 110. The pattern is compared against entries in the search array. The mask provides an indication of those bytes in the pattern that are not part of the pattern being searched. In one embodiment, the search array has an output line for each of the rows in the search array indicating whether the pattern being searched matched that content data stored in that particular row. The output lines of the search array are coupled to inputs of the sorter.

The sorter receives offsets that indicate a starting and ending point, respectively, of a range in the search register that is to be searched. Based on the match indication lines from the search array and the start and end range as specified by the offsets, the sorter processes the results of the search array. Such processing may include performing one or more operations. These operations may be index resolution functions that output a specific match index pursuant to the type of operation. In one embodiment, the operations include Find_First_Forward, Find_First_Reverse and Find_Population_Count. The operations are specified by the opcode in search instruction 110. The sorter may store intermediate or final results of previous operations that may be used in subsequent operations in conjunction with the match indication lines from the search array. In this manner, the sorter may be used to progressively navigate through the searchable data set by issuing a series of operations that utilize the results of previous operations. Thus, after processing, the sorter generates outputs indicating whether there is a match, and an index associated with the match. The index may indicate the location (address) in the search register where the first match occurs or where the last match occurs with respect to the top of the search register. Alternatively, the index may indicate the number of matches that occurred within the range specified by offsets.

Following the computation of the outputs, namely, the match indication and the index, they may be utilized to control the execution of one or more search instructions that follow by storing the outputs in general-purpose registers and utilizing indirect specification in subsequent instructions, branching to a specified address in the instruction memory (e.g., instruction memory 102) dependent on the match indication or other similar techniques. For example, the search results in search results storage 130 can be made available for branching via branch unit 114, which causes branching based on those results, or to instruction pointer & branch prediction unit 104 for changing values of the instruction pointer and determining a new set of rules that are to be executed by the rule processor. Note that the branch unit 114 may branch based on a value specified in a rule or opcode field, which branch unit 114 receives after decoding. Branch unit 114 operates in a manner well-known in the art and is described in greater detail below.

Additionally, the sorter may also be coupled to a register file for storage of results of previous operations for use in subsequent operations that may be executed after an arbitrary number of other operations have been executed. The results of the sorter may also be coupled to the rule processor instruction sequencer 104 to generate or assist in the generation of rule program offsets (e.g., branch addresses).

Alternatively, the instructions may specify rules for expression processing or state machine evaluation. Such an instruction may indicate that the state machine unit is to be invoked, what state machines are to be tested and what data is to be streamed or input to those state machines. In such a case, state machine unit 120 performs the expression processing in response to the instructions. State machine controller 122 controls state machine registers 124 based on state machine configuration information. State machine configuration information may be received by state machine unit 120 via load/store unit 116, packet buffers 134 or the buses 136, and state machine controller 122 loads this information in state machine registers 124. The state machine configuration information is used to program state machine behavior into state machine registers 124. Once programmed, data may be streamed across the state machines and the state machines may be evaluated. State machine evaluation unit 126 comprises hardware that evaluates one or more state machines programmed into the state machine registers 124 in view of the data being presented to state machine unit 120. In one embodiment, state machine evaluation unit 126 evaluates a large number of state machines in parallel. One embodiment of state machine unit 120 is described in more detail below.

Multiple state machines may be evaluated in parallel. Each state machine's behavior is specified in a set of state machine registers. For each state machine register set, a state machine evaluation unit executes the state machine specified in the register set against input data. Multiple state machines are specified via multiple sets of state machine registers. Multiple state machines can be evaluated in parallel, by providing an execution unit for each state machine register set. Each state machine could be fed independent data so that multiple state machines could be evaluated in parallel on multiple distinct data streams.

Context static random access memory (SRAM) 128 is used to store context information for multiple sets of data being evaluated (e.g., data from multiple different streams). If a packet is from a different stream or connection, then the front-end of the programmable rule processor issues an indication to state machine controller 122 that indicates a new stream (or connection) and not part of the same stream as the previous bytes being processed. This indication can be issued on either a dedicated instruction or issued on a field of the instruction that invokes the state machine operation. In response, state machine controller 122 causes the accumulated state machine evaluation information that exists in state machine registers 124 and state machine evaluation unit 126 to be stored away as context in context SRAM 128. More specifically, once a new rule provides this indication (e.g., via opcode), state machine controller 122 first stores all temporary status of the execution thus far in context SRAM 128 and loads in the context for the stream corresponding to the new rule. If it is a new stream, there is no context accumulated as yet and it starts with the register context initialized. Note that in this case after the end of the first packet of a fresh stream, fresh context is created. Note that in one embodiment, load/store unit 116 has access to context SRAM 128.

Note that the state machine unit 120 and search registers and search/sort array 116 act as distinct execution units that may operate in parallel. They may be processing the same or different data, or process the same data at different times.

In one embodiment, load/store unit 116 stores values into search registers 112 or remove values from search registers 112. Load/store unit 116 could load values into general purpose registers file 108 in a manner well-known in the art. Load/store unit 116 communicates with an on-chip data memory or data cache 132 and external memory (through bus and off-chip interface 136.

Load/store unit 116 also reads from and writes from a message buffer or packet buffer (temporary storage) 134. Packets flow into the message buffer or data buffer or packet buffer 134. Load/store unit 116 may move those into search registers 112 to enable an entire packet or message or document to be stored in search registers 112 via packet buffer 134. This allows the programmable rule processor to receive packet, message, document or stream data and load it into search registers 112 and, using the rule processor, do a series of finds or navigated windowed searches to locate specific portions of the data, characterize the packet, or delineate various zones in the packet or regions of interest in the packet wherein more pattern matching or state machine evaluation has to be performed. Rulesets stored in instruction memory specify the high level control flow of the program that includes the overall control flow graph specifying the graph or tree of rules that needs to be applied or performed. A variety of rich sequences or rulesets or grammars could thus be applied to the data. For example, initially, based on a context search to be performed, search registers 112 are loaded to find a zone of interest. Once the zone of interest in the data has been found, load/store unit 116 transfers that region to state machine unit 120 for application of a certain number of rules or regular expressions to that zone or portion of data. After transfer, a new rule is presented to state machine controller 122 that indicates which state machines to evaluate against this zone of data.

Load/store unit 116 can access state machine unit 120. For example, load/store unit 116 can send values to program state machine registers 124 with state machine behavior. Load/store unit 116 may provide data from a number of sources for evaluation. Load/store unit 116 may provide data from packet buffers 134 and can be streamed or fed to state machine unit 120. Load/store unit 116 can provide data or from buses via off-chip interface 136. Load/store unit 116 may send program or data values. State machine unit 120 then evaluates such data by having state machine controller 122 take the data and feed it to state machine registers 124 and state machine evaluation unit 126 for evaluation.

Note that although not shown, in one embodiment, state machine unit 120 and the search registers and search/sort arrays 112 may be coupled together using dedicated buses or shared buses to transfer data and/or results between each other.

Integer unit 118 performs general purpose integer functions. In one embodiment, integer unit 118 computes indexes or addresses, or transforms data that may be then fed back to the search registers or state machine registers.

Thus, one embodiment of the programmable rule processor includes three sets of registers. These include general purpose registers and two other sets of registers, namely search registers and state machine registers. An execution unit is coupled to each of the search registers and the state machine registers. For the state machine registers, the execution unit is the state machine evaluation unit, while for the search registers, the execution unit is the search and sort array. Thus, the rule processor takes a conventional microprocessor front-end and adds search registers and a search and sort execution hardware and state machine registers and state machine evaluation unit to evaluate state machines.

Figure 2:
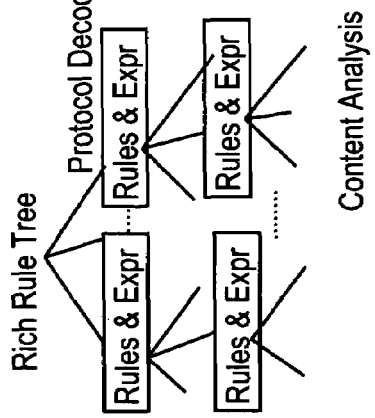
FIG. 2 is an example of the use of one embodiment of a rule processor.

FIG. 2 is an example illustrating the capability of one embodiment of the rule processor executing a rich rule tree comprising a sequence of operations that include a protocol decode function followed by the use of regular expression processing to find patterns of interest in specific portions of the input data. Referring to FIG. 2, the rule tree is shown with two phases or levels. The first phase involves a protocol decode operation in which packets going through a network are examined and decoded to understand what protocol is in effect. This requires pattern matching on potentially all the bytes in each packet. In this case, the search registers and search/parse array are used to perform a series of find operations. In this example, various routines of FindForward and FindNotForward operations, which are discussed in more detail below are used to determine if the protocol being used is HTTP and to determine if a GET command or a POST command is being used. More specifically, FindNotForward and FindForward operations locate where the commands begin and end as well as locating arguments for any universal resource indicator (URI). Note that each of a series of such location operations may be executed in a single iteration of a cycle.

After determining that the packet is some type of HTTP packet, determining if a get command or a post command exists, and after locating the arguments, the last sequence shown in the program, the FINDRE sequence or function, is used to determine if a set of patterns exists. To that end, the start and end locations that were found by the search register and search/parse execution hardware identify where the relevant bytes are in the search registers that may be extracted by the load/store unit and sent to the state machine unit for processing thereby. The instruction sequencer provides a command to point to a group of state machines for evaluation and the state machine controller decodes the group and invokes them against the data. In the end, results are available that indicate whether any of the URIs were found in that zone (i.e., whether there was a match). The result information can be passed back to the remainder of the rule processor, which may, for example, use the branch unit to branch to some other location based on those results (maybe due to some pattern identified in the payload of the packet).

Thus, one embodiment of the programmable rule processor performs stateful inspection, pattern matching, analysis, and state machine evaluation on high speed data streams.

Embodiments of the rule processor described herein include one or more advantageous features. For example, one embodiment of the rule processor may utilize a non-procedural high-level language to describe data and data patterns. The use of high level descriptions reduces coding effort. Embodiments of the present invention also provide support for complex protocols and data layouts, such as, for example, variable size, string terminated, conditional, overlaid, or arbitrarily ordered data, as well as arbitrary data layouts.

Exemplary Card Configurations

Figure 3:
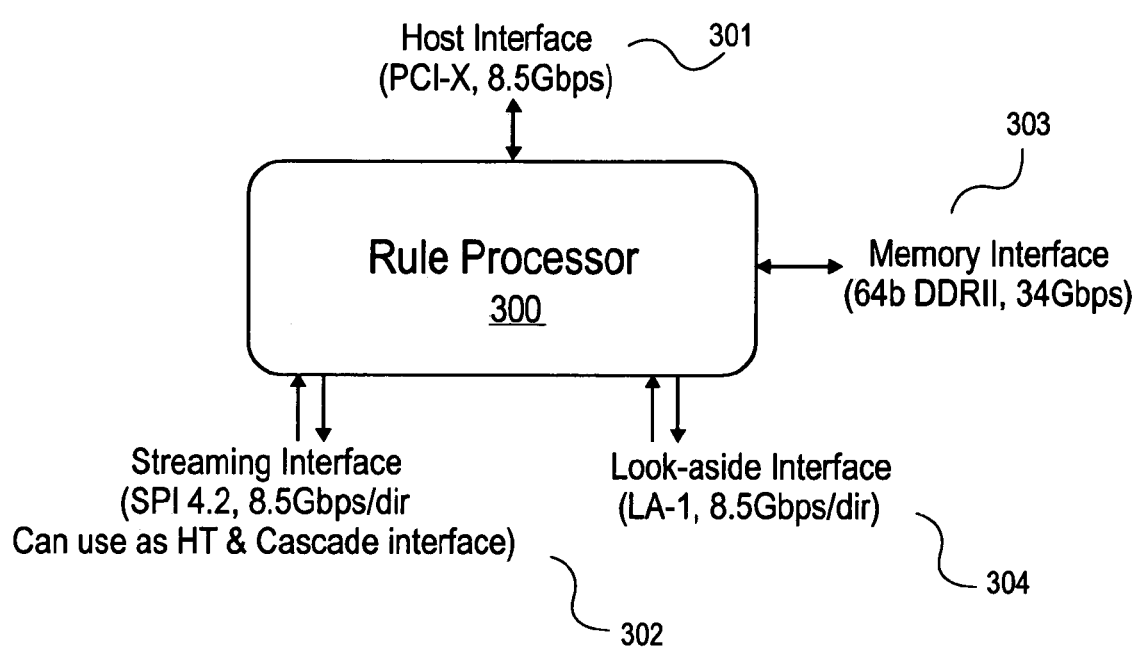
FIG. 3 illustrates interfaces of one embodiment of a rule processor.

FIG. 3 illustrates interfaces of one embodiment of a rule processor. Referring to FIG. 3, rule processor 300 includes a host interface 301, a streaming interface 302, a memory interface 303, and a look-aside interface 304. Host interface 301 may comprise, for example, a PCI-X interface. Streaming interface 302 may comprise, for example, a SPI 4.2 interface or a HT & Cascade interface. Memory interface 303 may comprise, for example, a DDRII interface. Look-aside interface 304 may comprise, for example, a LA-1 interface. Note that in other embodiments, the rule processor may have additional interfaces or a subset of the interfaces shown in FIG. 3.

Figure 4:
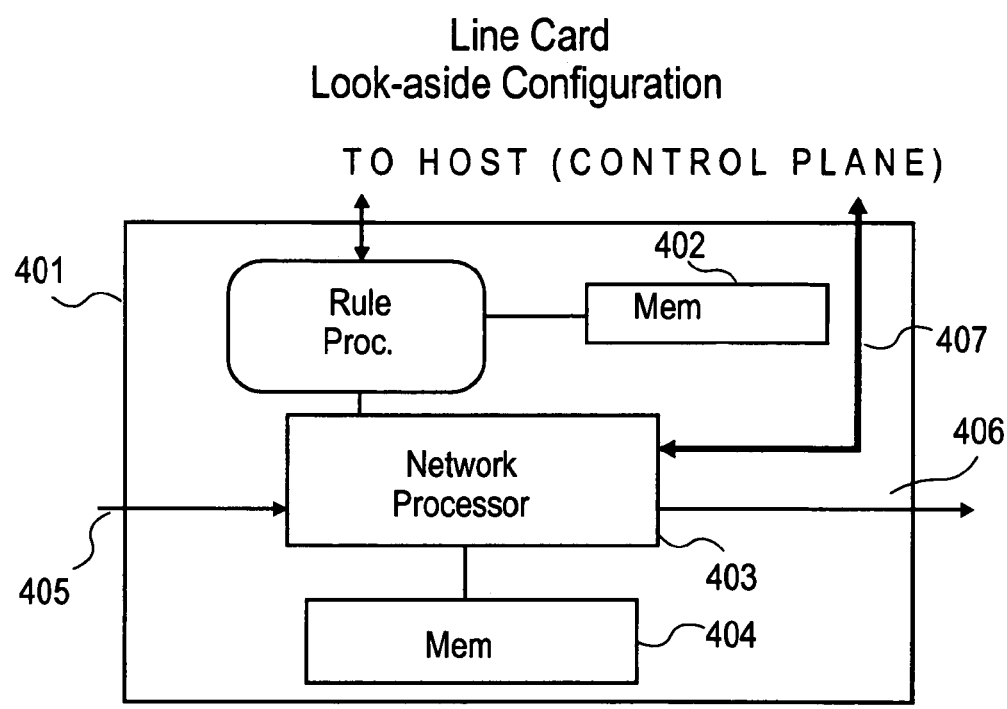
FIG. 4 is a block diagram of one embodiment of a line card with a look-aside configuration.
Figure 5:
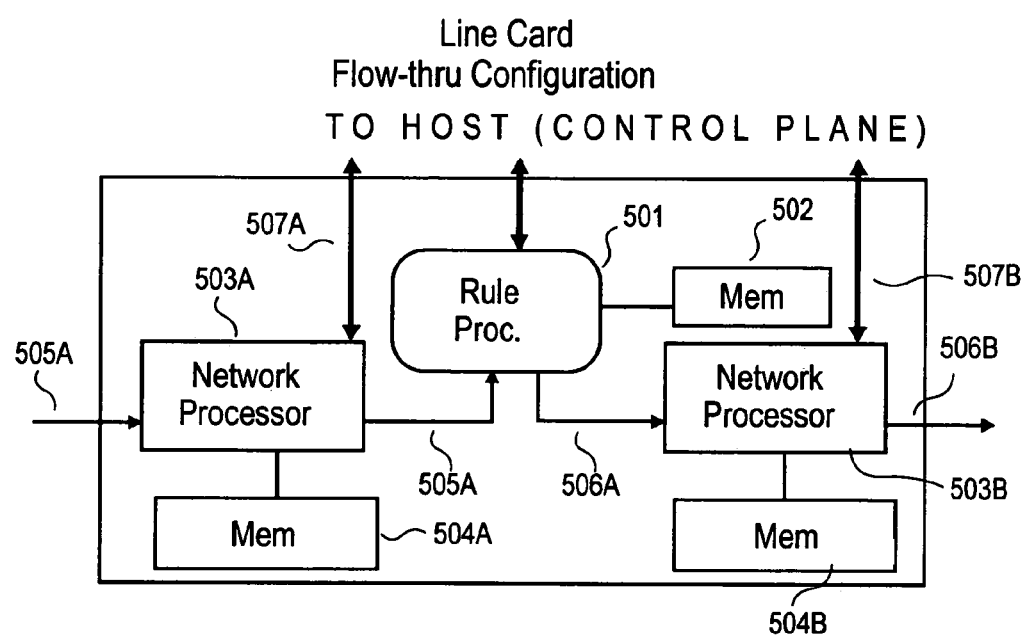
FIG. 5 is a block diagram of one embodiment of a line card with a flow-through configuration.
Figure 6:
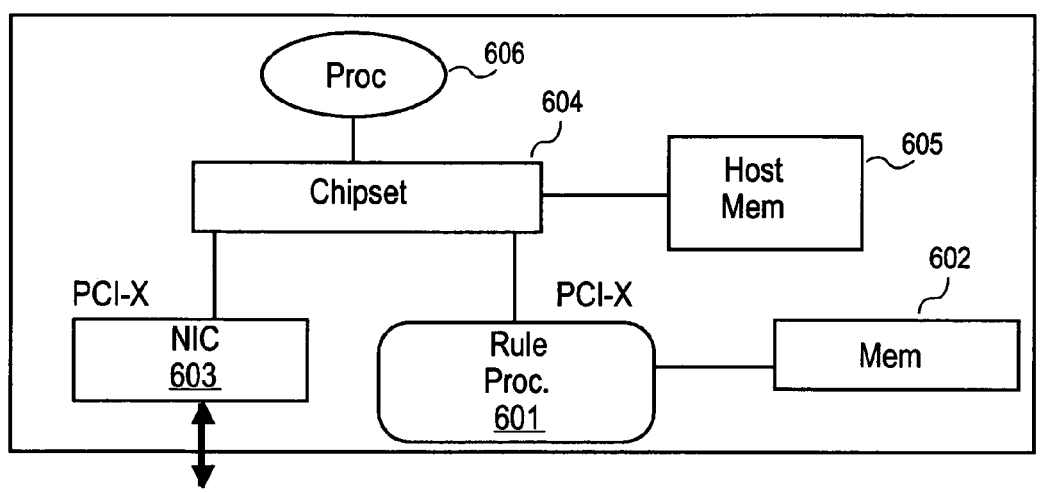
FIG. 6 is a block diagram of one embodiment of a server co-processor configuration.

A rule processor, such as rule processor 300, may be included in a number of card configurations. FIGS. 4-6 illustrate a number of exemplary card configurations. FIG. 4 is a block diagram of a line card look-aside configuration. FIG. 5 is a block diagram of a line card flow-thru configuration. The in-line codes operate on a stand-alone basis. Therefore, in such a configuration, the rule processor does not send results back to a host processor. The rule processor receives packets on one interface, unravels the packets and determines the protocol to detect packets. The rule processor creates results and may modify the data to be sent. Subsequently, the rule processor sends the data to its next destination. Note that rule processor performs, storing, routing, delivery and other network functions.

FIG. 6 is a block diagram of a server co-processor card configuration. In this configuration, the host processor receives a message, because the host processor handles all of the network functions. The host processor sends a message (packet or buffer) and some instructions indicating what type of rule processing is to be applied to the rule processor. In response, the rule processor applies a rule processing sequence or program and then sends the results to the host processor. The host is then able to take any action, if necessary.

Referring to FIG. 4, the line card configuration comprises a rule processor 401 having a memory 402 coupled to its memory interface and a network processor 403 coupled to a streaming interface of rule processor 401. Rule processor 401 has a host interface for coupling to a host or other control plane.

Network processor 403 is coupled to a memory 404 and includes an interface 407 for coupling to a host or other control plane. Network processor 403 has an input 405A and an output 405B. Input 405A is coupled to receive network traffic, which network processor 403 forwards to rule processor 401 for processing (e.g., attack detection using patterns, rules, expressions and grammar). The network traffic is forwarded from network processor 403 via output 406.

Referring to FIG. 5, the line card flow-thru configuration comprises a rule processor 501 having a memory 502 coupled to its memory interface, an output 505B of a network processor 503A coupled to its streaming interface, and an input 506A of a network processor 503B coupled to its look-aside interface. Rule processor 501 has a host interface for coupling to a host or other control plane.

Network processor 503A is coupled to a memory 504A and includes an interface 507A for coupling to a host or other control plane. Network processor 503A has an input 505A and an output 505B. Input 505A is coupled to receive network traffic, which network processor 503A forwards to rule processor 501, via output 505B, for processing (e.g., attack detection using patterns, rules, expressions and grammar). After processing, rule processor 501 forwards the network traffic to network processor 503B via input 506A. Network processor 503B is coupled to a memory 504B and includes an interface 507B for coupling to a host or other control plane. Network processor 506B outputs network traffic via output 506B.

Referring to FIG. 6, the co-processor card resembles a standard PCI-X card that includes a host processor 606 coupled to a chipset 604 via a host interface. Chipset 604 includes a memory interface coupled to host memory 605. Chipset 604 also includes two PCI-X interfaces, one coupled to a network interface card (NIC) 603 and the other coupled to a host interface of rule processor 601. Rule processor 601 also includes a memory interface coupled to memory 602.

In the arrangement in FIG. 6, content is received via NIC 603 and is sent via chipset 604 to host memory 605. Processor 606 receives an indication (e.g., interrupt) indicating that content has been received and is stored in host memory 605. In response, host processor 606 signals rule processor 601 to handle the content processing. Once completed, rule processor 601 signals host processor 606, which signals NIC 603 indicating to NIC 603 that the data in host memory 605 is ready for transfer. Finally, NIC 603 access the network traffic from host memory 605 via chipset 604 and sends the network traffic out to the network

An Exemplary Embodiment of Search Register and Search/Sort Array Hardware

One embodiment of the search register and search/sort array hardware is given below. Note that alternative embodiments of search register and search/sort array hardware may be used.

Figure 7:
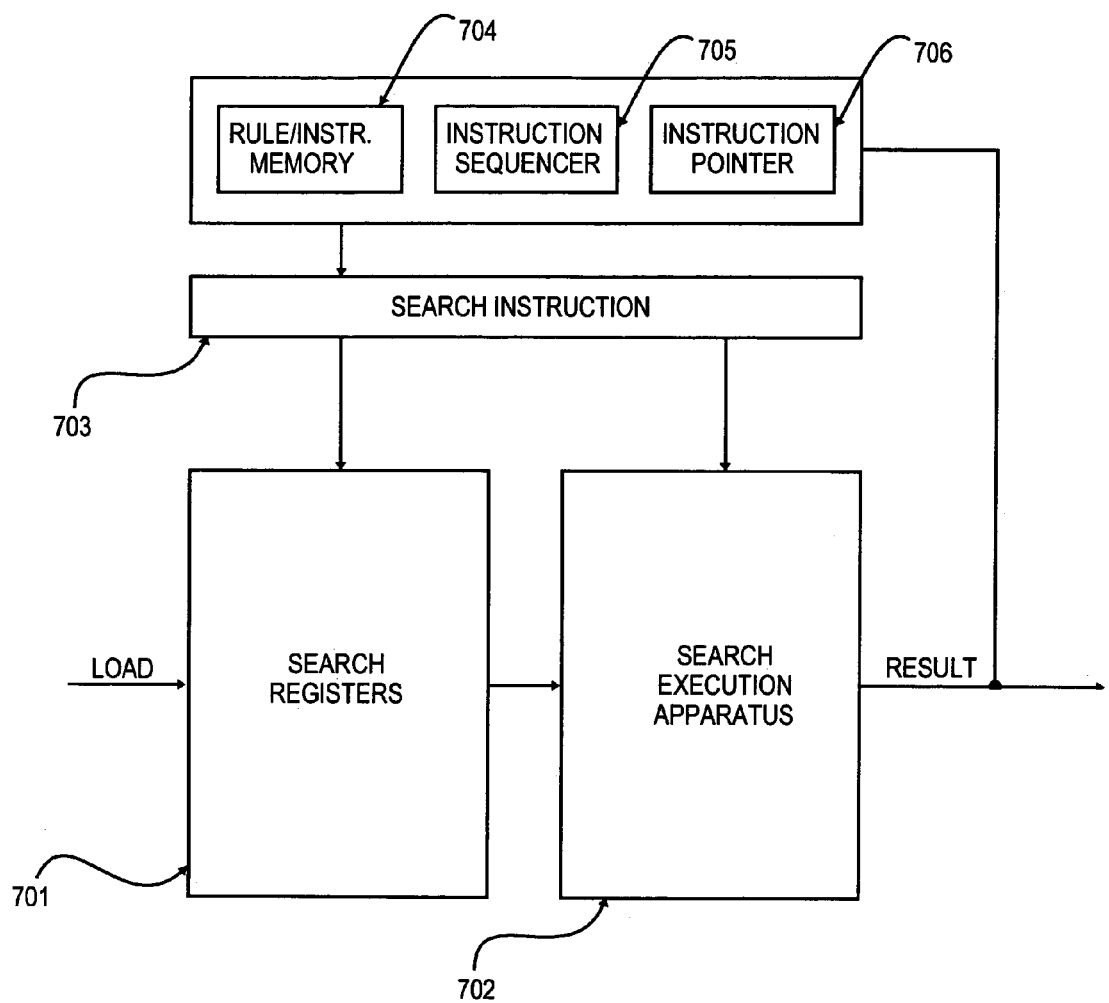
FIG. 7 is a block diagram of one embodiment of a rule processor with a search apparatus.

FIG. 7 is a block diagram of a portion of one embodiment of a rule processor comprising search registers 701 and search execution hardware 702. Such a portion may be part of the rule processor of FIG. 1. Search instruction 703 is presented to search registers 701 and search execution hardware 702. As described above, the processor further comprises of an instruction store referred to as rule/instruction memory 704 and an apparatus to control the flow of instructions that includes, in one embodiment, instruction sequencer 705 and instruction pointer 706.

A typical search entails presentation of an instruction or rule to the search registers. The rule specifies a pattern along with one or more additional search parameters. In one embodiment, the search function returns a number of results. These include an indication of whether or not a match was found between the pattern and the content in the search registers, and also a match location indicating where in the payload search registers the match occurred.

Additional search control parameters are provided by the rule processor to search execution hardware 702. Search instructions might provide a mask vector along with a set of bytes comprising the target search pattern. The mask vector might be comprised of bits that correspond to the target pattern byte or bytes. In one embodiment, specific bytes in the target pattern to be ignored during the search operation are selected by setting the corresponding bits in the mask vector to a pre-determined logic level of 0 or 1. Thus, the target pattern used in the search may be reduced in size. Additionally, the rule processing instructions may specify starting and ending locations that constitute a search window or a range of bytes in search registers 701 within which the search is constrained.

Additional parameters to search instructions may include a branch address to be utilized by the rule processor in the event of an unsuccessful search.

An example of a search instruction is a windowed-find-first-forward instruction. In one embodiment, in a windowed-find-first-forward search, given an 8-byte pattern specified in or by a rule, an 8-bit mask, a starting location offset address pointing to a starting byte in the content data (e.g., document data) in search registers 701, and an ending location offset address pointing to a ending byte in the content data (e.g., document data) in search registers 701, the search returns the starting address in search registers 701 of the first string after the specified starting location address that matches the masked pattern, providing this address starts before the ending location offset address. In another example, a windowed-find-first-reverse search may be performed. In one embodiment, in a windowed-find-first-reverse search, given an 8-byte pattern in the rule, an 8-bit mask, a starting location offset address pointing to a starting byte in the content in search registers 701, and an ending location address pointing to a ending byte in the content in search registers 701, the search returns the starting address of the last string before the specified ending location address that matches the masked pattern, providing this address starts after the starting location offset address.

The rule processor also provides a control store or rule memory 704 that contains rules or rule sets to be applied to the payload data. In one embodiment, the memory 704 holds rule sets or sequences of instructions or code that describe patterns, rules, expressions or grammars that need to be applied and detected in search registers 701. The rule vocabulary may specify a range of operations, including, but not limited to, global or local (windowed) searches with either exact matches or partial matches, with individual and multiple match information delivered to some registers, primitives to generate offsets and addresses in the output payload of the rule processor, as well as logical and computational operators to be applied to the search results. Such rules may be composed of multiple fields that specify the various parameters described above. Each parameter may be directly specified within the rule or, alternatively, indirectly specified through the use of a pointer to a register or memory location containing the value to be used. In embodiments where both direct and indirect specifications are permissible, each such field may contain an additional sub-field that indicates whether direct or indirect specification is being utilized.

In one embodiment, the rule processor performs sequences of prioritized and directed searches of anchored or unanchored patterns and windowed and ranged searches for an arbitrary long pattern starting at any arbitrary location in a document, stream, message, or packet. The patterns as well as the range control and program control flow (e.g., branch addresses) can be specified statically in rules contained in the program store or dynamically selected indirectly from a register file using a pointer or index set forth in a rule. This enables powerful dynamic and contextual pattern matching.

The rule processor presents one or more rules of a search to a search register structure. In one embodiment, the search register is a 2 KB register file with each entry being one byte wide. Data to be searched is loaded in the search register file. Each rule may specify a pattern that is presented to the search register file to determine if the pattern is present in the data stored therein. A mask may also be provided to further configure the pattern and/or to reduce the size of the pattern being used in the search.

Figure 8A:
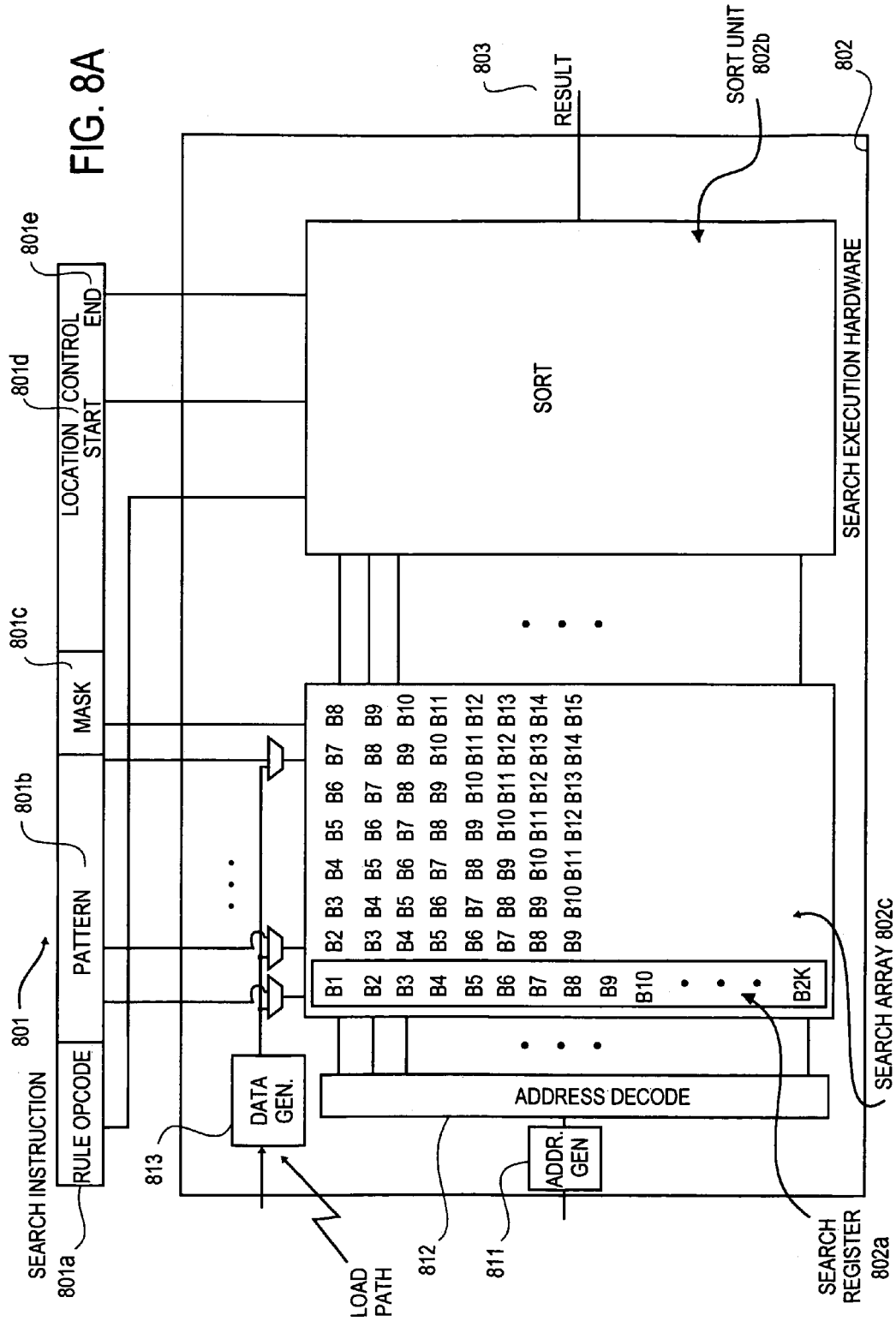
FIG. 8A is a block diagram of one embodiment of a search register and the search execution hardware.

Referring to FIG. 7, search registers 701 and search execution hardware 702 is collectively presented with a search instruction 703. Search instruction 703 is further illustrated in FIG. 8A. Referring to FIG. 8A, search instruction 801 comprises an opcode 801a that describes the type of search operation, a search pattern 801b, a mask 801c that specifies the bytes in the pattern that are relevant to the current search instruction and two offsets 801d and 801e that specify the starting and ending bounds, respectively, of the locations in the search register that are relevant to the current search instruction. Search execution unit 802 outputs a result 803 that, in one embodiment, comprises an indication of the success of the search operation and additionally includes one or more parameters such as, but not limited to, an index that indicates the location within the search register that met the search instruction of the search operation.

Search execution hardware 802 comprises search register 802a and a sorter 802b as shown in FIG. 8A. Search register 802a stores searchable data, which may be content from a document, message, packet, or any other well-known source of data that can undergo searching. The size of search register 802a may be arbitrary, M bytes, and in one embodiment is organized within a larger array, called a search array 802c, of M rows of N bytes each. Data from search register 802a is stored in a replicated manner inside the search array In one embodiment, data to be searched is stored in search register 802a by use of a data generator 813, based on addresses generated from address generator 811, which are decoded by address decoder 812. The process of storing also entails recording the size of the searchable data in search register 802a. For data sets that are smaller in size than the capacity of search register 802a, search register 802a provides a mechanism to restrict the search operation to the appropriate data. In one embodiment, data generator 813 may store a pattern that is established a priori to be data that will be ignored for search operations in the remaining locations of search array 802c or in an alternate embodiment search register 802a disables the appropriate locations of search array 802c from participating in search operations.

Irrespective of the manner in which the searchable data is organized throughout search array 802c, search array 802c receives a pattern 801b and mask 801c. Pattern 801b is compared against entries in search array 802c. In one embodiment, search array 802c has M rows of N bytes, where N is the same number of bytes as are in pattern 801b. Mask 801c provides an indication of those bytes in pattern 801b that are not part of the pattern being searched. In other words, if pattern 801b is a pattern that is less than N bytes, mask 801c specifies which bytes of pattern 801b search array 802c is to ignore. In one embodiment, search array 802c has an output line for each of the M rows in search array 802c indicating whether the pattern being searched matched that content data stored in that particular row. In one embodiment, if the output is a 1, the pattern matched content data in the particular row. The M output lines of search array 802c are coupled to inputs of sorter 802b.

Sorter 802b is also coupled to receive offsets 801d and 801e that indicate a starting and ending point, respectively, of a range in search register 802a that is to be searched. In one embodiment, these offsets are $\log_2 M$-bit numbers. Based on the match indication lines from search array 802c and the start and end range as specified by offsets 801d and 801e, sorter 802b processes the results of search array 802c. Such processing may include performing one or more operations. These operations may be index resolution functions that output a specific match index pursuant to the type of operation. In one embodiment, the operations include Find_First_Forward, Find_First_Reverse and Find_Population_Count. The operations are specified by opcode 801a in search instruction 801. Sorter 802b may store intermediate or final results of previous operations that may be used in subsequent operations in conjunction with the match indication lines from search array 802c. In this manner, sorter 802b may be used to progressively navigate through the searchable data set by issuing a series of operations that utilize the results of previous operations. Additionally, sorter 802b may also be coupled to a register file for storage of results of previous operations for use in subsequent operations that may be executed after an arbitrary number of other operations have been executed. The results of sorter 802b may also be coupled to the rule processor instruction sequencer, such as instruction sequencer 705 of FIG. 7, to generate or assist in the generation of rule program offsets (e.g., branch addresses).

After processing, sorter 802b generates outputs indicating whether there is a match, and an index associated with the match. The index may indicate the location (address) in search register 802a where the first match occurs or where the last match occurs with respect to the top of search register 802a. Alternatively, the index may indicate the number of matches that occurred within the range specified by offsets.

Note that the range specified by the offsets may be changed dynamically. For example, a first search instruction may be applied to search array 802c initially while a range that is specified by offset 801d and offset 801e comprises all rows of search array 802c. However, after the first search instruction and a match is identified, the start and end ranges may be changed in a subsequent search instruction such that the searching begins from a location that includes the match lines found within the range specified by the previous search instruction. This capability is achieved by using the indirection functionality that allows fields of a rule or an instruction to reference values in a general purpose register file.

In FIG. 8A, in one embodiment, search array 802c is comprised of 2K rows of 8 bytes each. Thus, search register 802a holds 2K bytes of data. Search array 802c holds replicated data. Each 8-byte string that begins with a distinct byte in search register 802a is stored as a distinct row of bytes in search array 802c. These strings are comprised of the distinct byte from search register 802a and additionally 7 consecutive bytes that follow that byte in search register 802a. Thus, each row of search array 802c holds the 7 most significant bytes of the previous row and additionally one immediately succeeding higher order byte, which is appended to the right of these 7 bytes.

Data is loaded into search array 802c by data generator 813, which, in one embodiment, supplies the appropriate 8 bytes of data for each row from the source data.

Figure 8B:
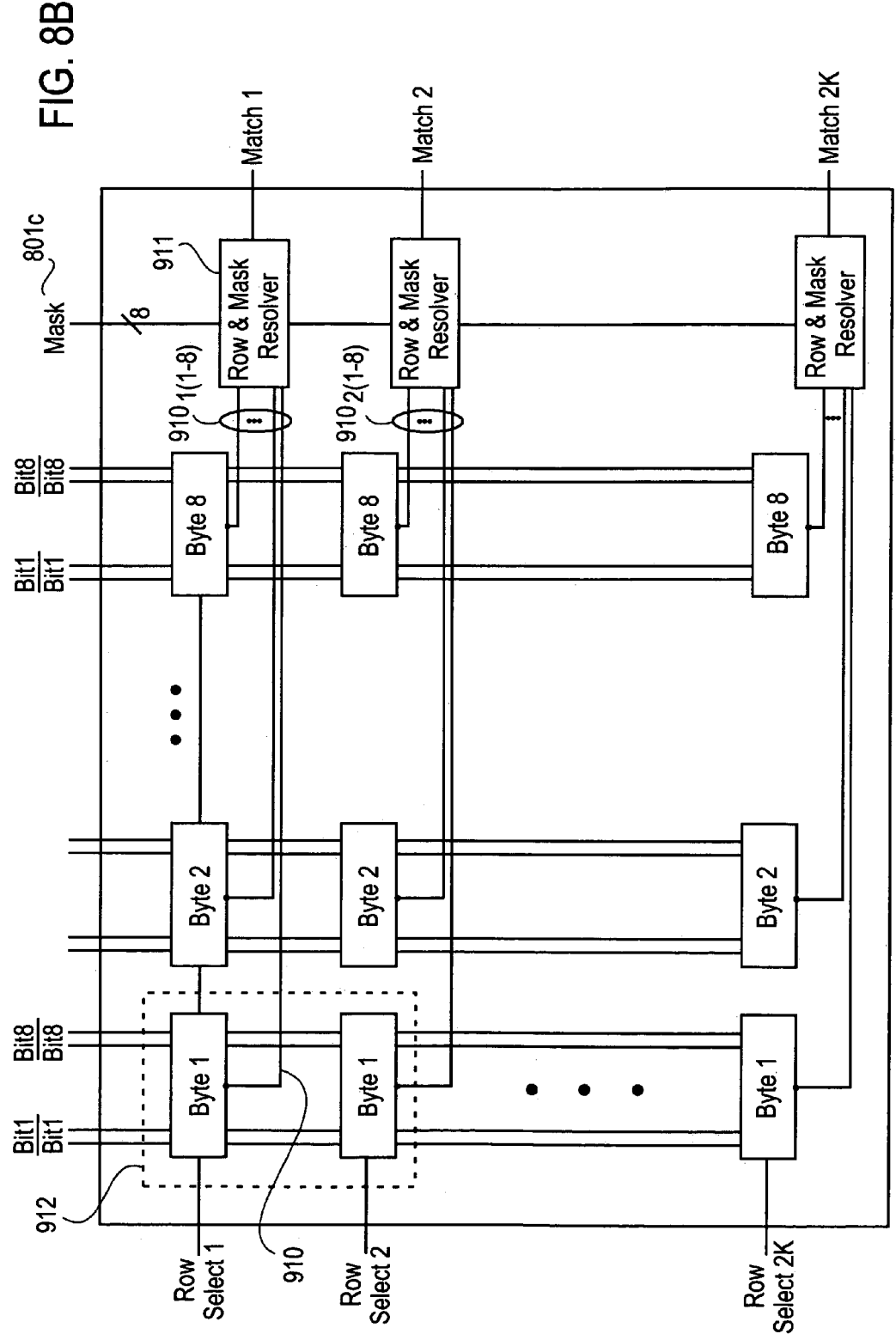
FIG. 8B is a block diagram of one embodiment of a search array.
Figure 10:
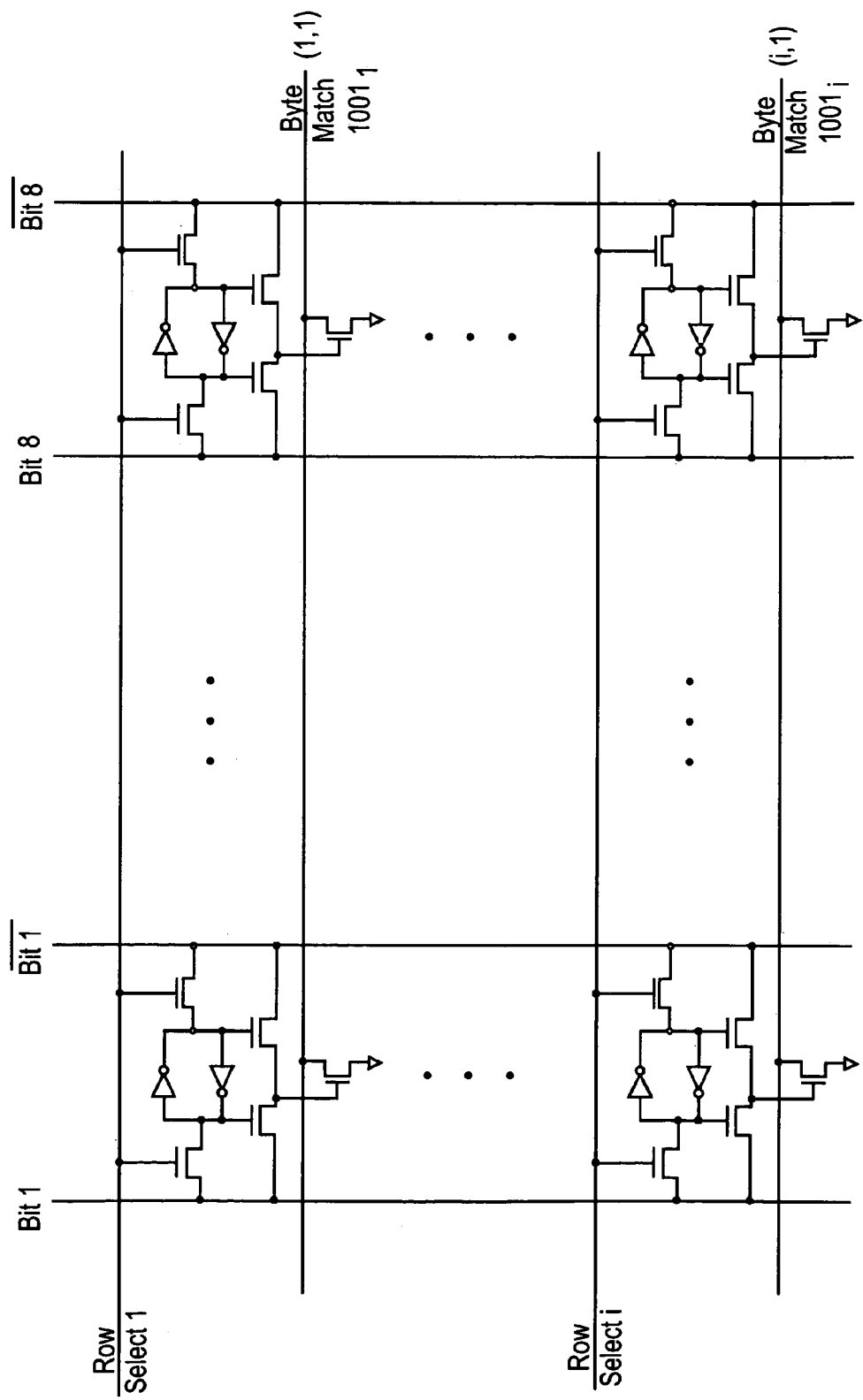
FIG. 10 is a circuit schematic of one embodiment of a search array.

In one embodiment, an 8-byte search pattern is presented in each search instruction. The search pattern is aligned with search array 802c such that each of the 8 columns in the array is presented with a unique byte. This is shown in FIG. 8B. Referring to FIG. 8B, state bytes 1 through 8 are stored in the search array for each of rows 1 through 2K. For each byte that is stored as an element of the search array of 2K rows and 8 columns shown in FIG. 8B, there exists a signal line 310. For example, byte 1 of row 1 generates signal line $310_{11}$, byte 2 of row 1 generates signal line $310_{12}$, byte 1 of row 2 generates signal line $310_{21}$, and so forth. The signal for each byte is asserted during a search operation when the stored byte matches the byte of the search pattern that is presented to the same column that the element belongs to. In this embodiment, where each row contains 8 bytes, 8 signal lines, for example $310_{11}$ through $310_{18}$, are used to indicate each of the byte level matches in the row. The byte level matches for each row are ANDed together with the masks from masks 102c in row & mask resolver blocks 311. The result of the AND function is an indication of whether a match occurred in each row. In this embodiment, where the search array includes 2K rows, 2K match lines are output to the sorter. The circuit structure of two of the byte elements 312 in this array is shown in FIG. 10. The circuit operates in a manner that provides a fully parallel search operation by performing a simultaneous search within all its rows in one clock period. When a search operation is conducted, all byte level match lines 401 in a column simultaneously indicate matches with their respective stored bytes. A search operation is invoked on all columns simultaneously allowing the masked reduction block in each row to indicate a row level match. Thus, in this embodiment of the search array, in a single clock, a parallel search of all 2K strings in the search register that are comprised of 8 contiguous bytes is performed and the results are indicated on the 2K match lines.

Figure 9A:
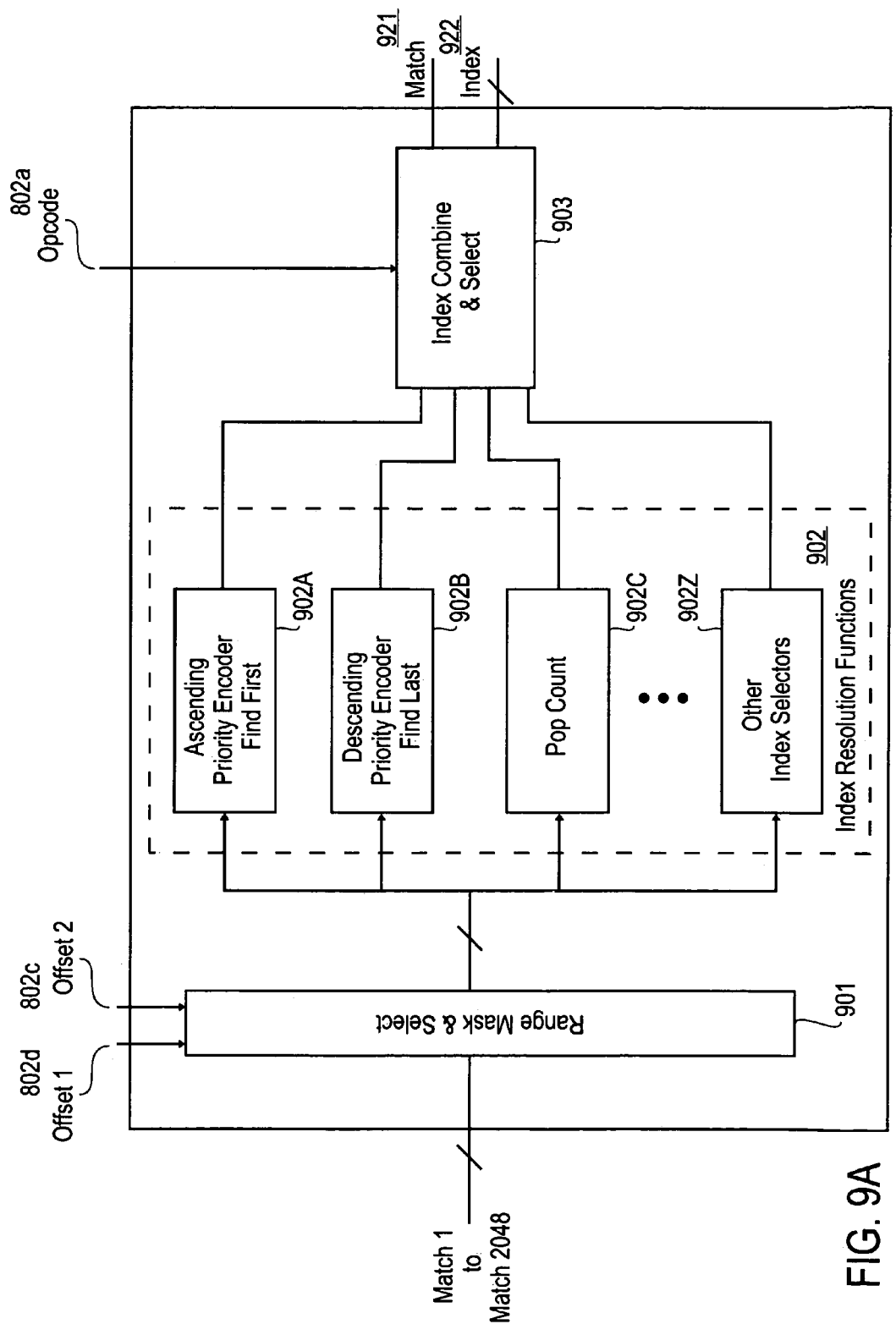
FIG. 9A is a block diagram of one embodiment of a sorter.
Figure 9B:
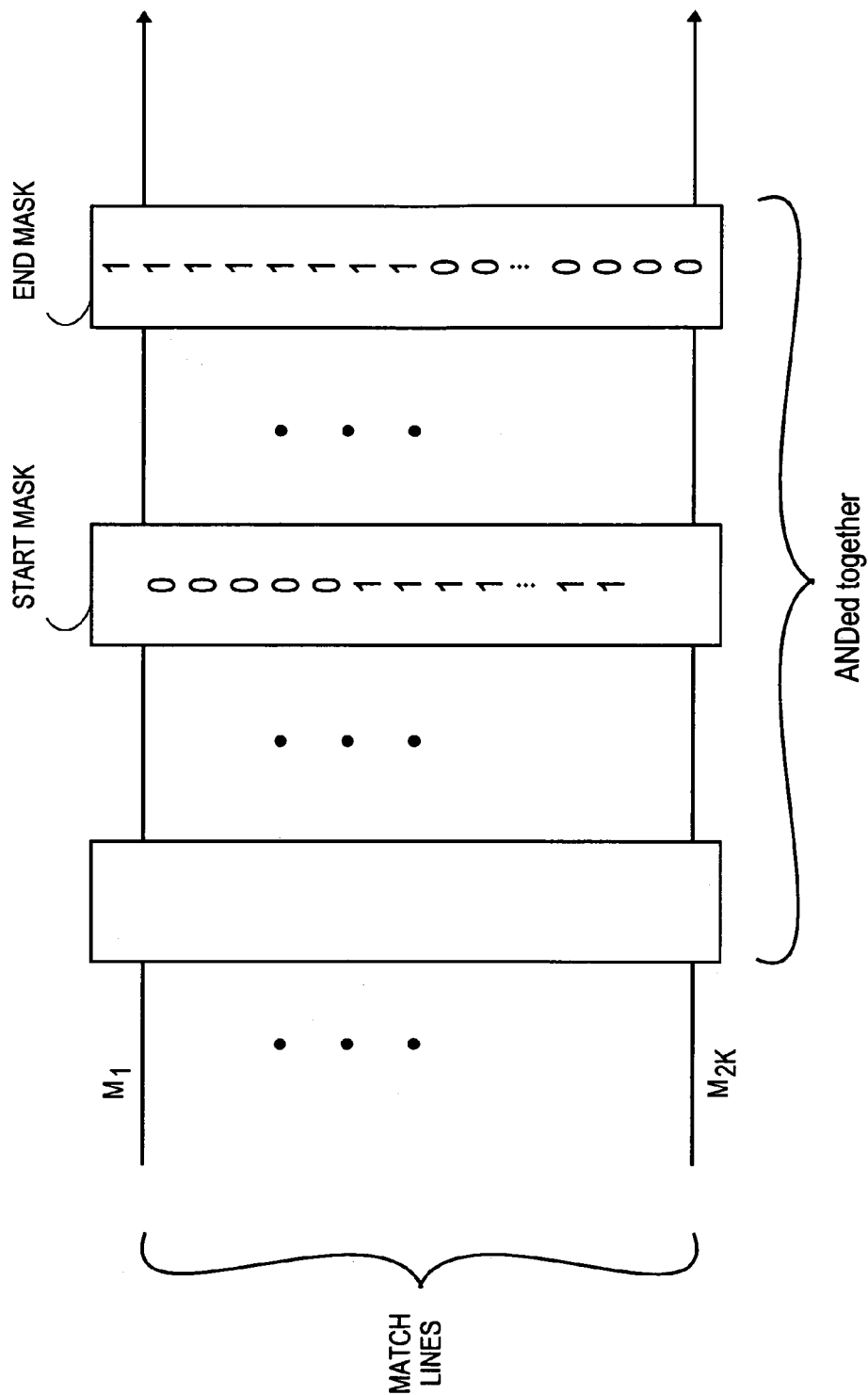
FIG. 9B is a block diagram of one embodiment of a range select mechanism in a sorter.

FIG. 9A is a block diagram of one embodiment of a sorter. Referring to FIG. 9A, match lines 910 from the search array are coupled to and input to a range mask and select unit 901. In one embodiment, match lines 910 comprise match 1 to match 2048. Range mask and select unit 901 receives a pair of offsets specifying a range of rows of the M match lines from search array to perform further processing. In one embodiment, the offsets are 11 bit numbers that are converted into 2K mask bits that may be ANDed together with the match lines to provide an output. Such an example is shown in FIG. 9B in which the offset for the start range is converted to one or more zeros with the remainder of the bits being a one bit, while the offset for the end of the range is converted to all zeros starting from the bottom up to a certain point after which all bits are ones. By ANDing these registers with the match lines, the matches that occur within the specified start and ending range are output without change, while other match lines outside the range are masked (e.g., changed to a predetermined logic level).

The output of range mask and the select unit 901 is coupled to the inputs of index resolution functions unit 902. In one embodiment, index resolution functions unit 902 includes one or more functions that are performed on the outputs of range mask and select unit 901. For example, as shown, the sorter includes an ascending priority encoder 902A to find the first occurrence (with respect to the top of the search array) of a match between the specified pattern of N bytes and the content data in the search array as indicated by the non-masked match lines. A descending priority encoder 902B may also be included to find the last occurrence (with respect to the top of the search array) of a match between the N byte pattern and the content data in the search array as indicated by the non-masked match lines. A population counter 902C indicates the number of matches that occur between the N byte pattern and the data in the search array as indicated by the non-masked match lines. Other index selectors may also be used.

The outputs of index resolution functions unit 902 are input to an index combine and select unit 903, which is also coupled to receive opcode 102a. The opcode 102a is specified in the search instruction and selects one of the index resolution function outputs as the output of the sorter. Index combine and select unit 903 generates a match indicator 921 indicating that there was match along with an index 922 indicating that the location within the search array of the data that is either the first occurrence of a match if the output ascending priority encoder 902A is selected, the last occurrence of a match in case the output of descending priority indicator 902B is selected, indicates the number of matches in the non-masked match lines if the pop counter 902C is selected, etc. Following the computation of the outputs, namely, match indicator 921 and index 922, they may be utilized to control the execution of one or more search instructions that follow by storing the outputs in general-purpose registers and utilizing indirect specification in subsequent instructions, branching to a specified address in the instruction memory (e.g., instruction memory 704) dependent on the match indicator 921 or other similar techniques.

Figure 11:
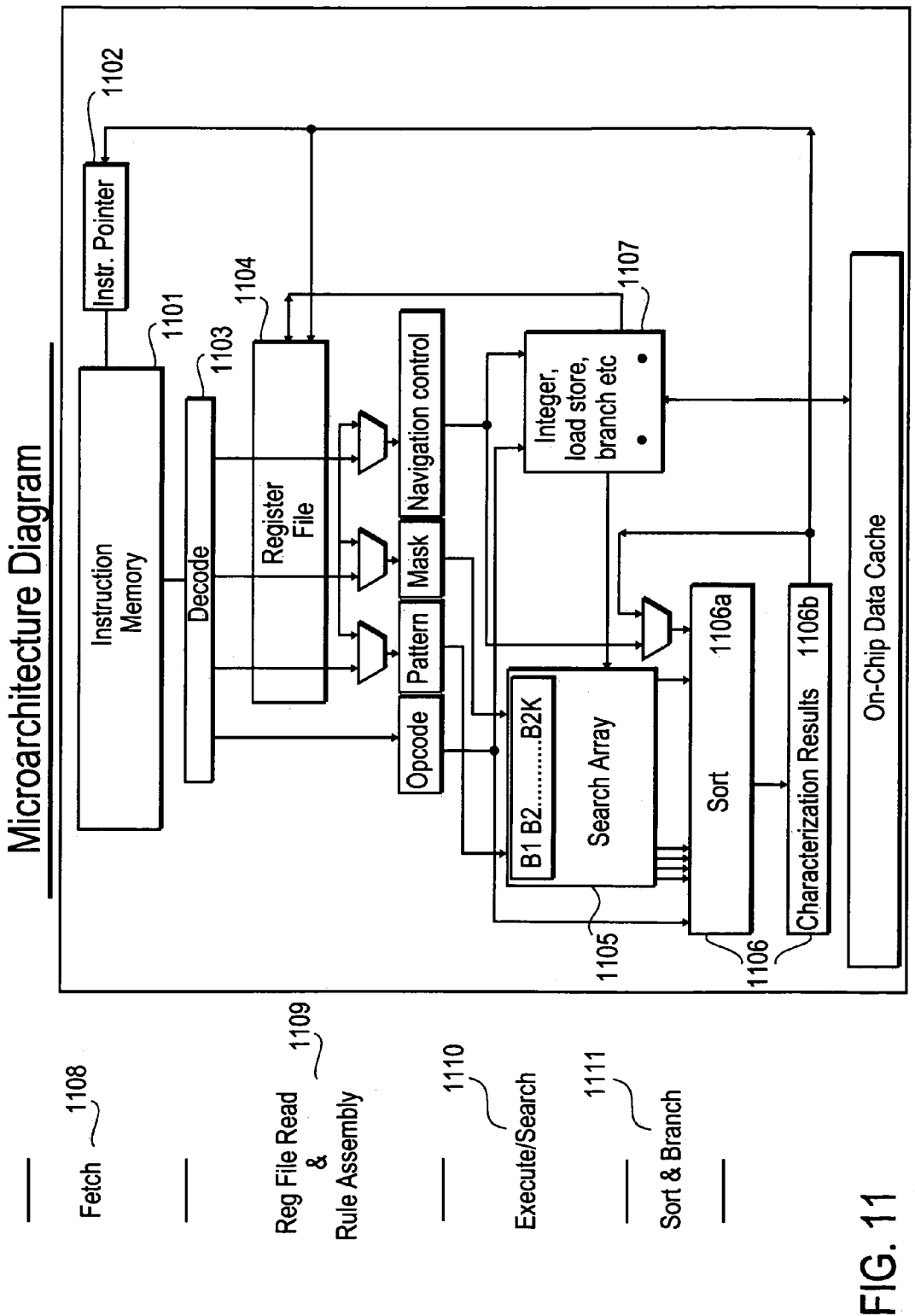
FIG. 11 illustrates an exemplary micro-architecture of a rule processor comprising of four processing stages.

FIG. 11 illustrates the micro architecture of a rule processor that includes search apparatus. Referring to FIG. 11, the search instructions are stored in an instruction memory 1101. Instructions are selected by flow control using an instruction fetch pointer register 1102. Instructions are decoded by a decoder 1103. The individual subsets of each instruction are either taken from the instruction or fetched from general purpose register file 1104. Then the various subsets of each instruction are supplied to the separate units, namely, search array 1105, sorter 1106 comprising of a sort unit 1106a followed by a characterization unit 1106b, a conventional arithmetic logic unit (ALU) 1107, as set forth above. In one embodiment, the processing of each instruction follows a 4-stage pipeline consisting of (i) instruction fetch stage 1108, (ii) an instruction assembly stage 1109, (iii) a search/execute stage 1110, and (iv) a sort and delivery of results and/or branch stage 1111.

In one embodiment, the rule engine instruction format comprises a number of bits are divided into subsets that contain various fields to issue directives to various hardware engines on the rule processor. In one embodiment, the search subset contains a search/sort opcode field, a pattern field (in one embodiment, this contains a value or a pointer to a location that provides a value along with an additional bit(s) that specifies whether the value in the instruction is a pointer or not), a byte level mask field, a start location address field (in one embodiment, this field, comprises a value or a pointer to a register that provides the value, and including an additional bit(s) to indicate whether the start location address contains the value or such a pointer), an end location address field (in one embodiment, this field, comprises a value, or a pointer to a register that provides the value, with an additional bit(s) to specify whether the end location address information is a pointer or not), a result register field that specifies where the results of the search operations are to be returned and a branch address field (in one embodiment, this field comprises a value or a pointer to a register that provides the value, with an additional bit(s) to specify whether the branch address information is a pointer or not)

FIG. 12 illustrates an example pseudo-code 1201 of a ruleset that may be processed by one embodiment of the rule processor described above. The rule has multiple patterns with some specific constraints on the locations of where such patterns may exist in a message or document or packet. The constraints are expressed in the pseudo-code through the use of key words such as BEFORE and AND. For purposes of simplicity, the patterns in 1201 are used in this example without any additional delimiters between strings, which may be the case in practice. Also, in FIG. 12 is a listing 1202 of the corresponding micro-code for the exemplary rule processor. The format of the instructions is as described earlier. Using the first instruction 1203 for illustration, it consists of the FIND_FIRST_FORWARD opcode where all 8 bytes of the Pattern "cp /bin/" are relevant for the search (through the use of 0xFF as Mask) with the start and end offsets expressed as constant values (through the use of Indirection Flags) to denote the start and end of the searchable payload held in the search registers. For purposes of brevity, the derivation of the constant numbers has been skipped here. The result of this opcode is shown to be loaded into general purpose register A and lastly the branch address is specified as the constant value of 11 which is the instruction that would follow the micro-code snippet shown in FIG. 12. This instruction will cause the search execution hardware to search for the occurrence of "cp/bin/" within byte locations 0x03D and 0x800 of the search registers 802a. All rows in the search array 802c that match will assert their respective match lines 910 by the end of the search execution stage 1110 of the micro-architectural pipeline. In the sort and branch stage 1111, the sorter 802b converts 0x03D and 0x800 into bit vectors as illustrated in FIG. 9B. The bit vectors are used to perform the range mask and select function 901 to negate any matches that start outside of the location window from 0x03D to 0x800. Of the remaining matches that are now within the location window, the opcode of this instruction chooses the ascending priority encoder 902a from the index resolution functions 902 to convert the lowest numbered match into an 11-bit binary encoded location. If such a match was found, match 921 would be asserted and index 922 would hold the 11-bit location. If match 921 were to be not asserted because a match was not found, the instruction sequencer 705 would load the branch address 0xB into the instruction pointer 706. Index 922 would be loaded into general-purpose register A by the control circuitry of the register file 1104. The load into general-purpose register A and the load of the instruction pointer, if applicable, will be completed by the end of the sort and branch execution stage 1111. Second instruction 1204, FIND_FORWARD_ANCHORED, further illustrates the rich vocabulary of the exemplary rule engine. It is a variant of FIND_FIRST_FORWARD in that the match begins at the start_offset for the search to be successful.

FIG. 13 illustrates the execution of the micro-code shown in FIG. 12 within the micro-architecture of the exemplary rule processor shown in FIG. 11. Table 701 shows the execution across multiple clock cycles. For purposes of simplicity, it is assumed that all the search instructions are successful in finding the specified patterns in the search registers. In one embodiment, the execution proceeds in a pipelined fashion through the 4 stages described in FIG. 11. Through the use of indirect specification, the execution of a search instruction can use the offsets calculated in the immediately preceding instruction. Therefore, instructions 1 through 8 are executed in consecutive cycles. Instruction 8 is a branch dependent on the result of the comparison of the contents of general purpose register A and general purpose register B which are computed in clock cycle 8 and clock cycle 9 respectively. The branch is taken in clock cycle 11 and the instruction execution completed in clock cycle 14. Thus, the complex pattern-matching expression described using pseudo-code 1201 is executed in only 14 clock cycles using the rich instruction vocabulary of the exemplary rule processor. This example illustrates the capability and efficiency of the exemplary rule processor on execution of functions that include dynamic and contextual search and analysis of documents, messages or packets.

An Exemplary Embodiment of State Machine Unit Hardware

One embodiment of state machine unit hardware is described below. Note that other embodiments of state machine unit hardware may be used.

A state machine evaluation architecture is described that allows for efficient implementation and evaluation of state machines and finite state automata. In one embodiment, the apparatus employs a technique of building graphs using circuits in a way that enables, in a programmable manner, the physical realization of any arbitrary control flow graph in hardware. The apparatus provides a high performance and compact solution for implementation of multiple state machines as well as large and complex state machines. The apparatus can be used for efficient parsing and evaluation of data via the hierarchical application of thousands of regular expressions on the incoming data stream. Such an apparatus may be the central evaluation engine for a regular expression processor. Note that one embodiment of finite state machine units are described in U.S. patent application Ser. No. 10/650,364 entitled "Method and Apparatus for Efficient Implementation and Evaluation of State Machines and Programmable Finite State Automata," filed on Aug. 27, 2003; and U.S. patent application Ser. No. 10/755,048 concurrently filed with this application, which are incorporated herein by reference.

Figure 14:
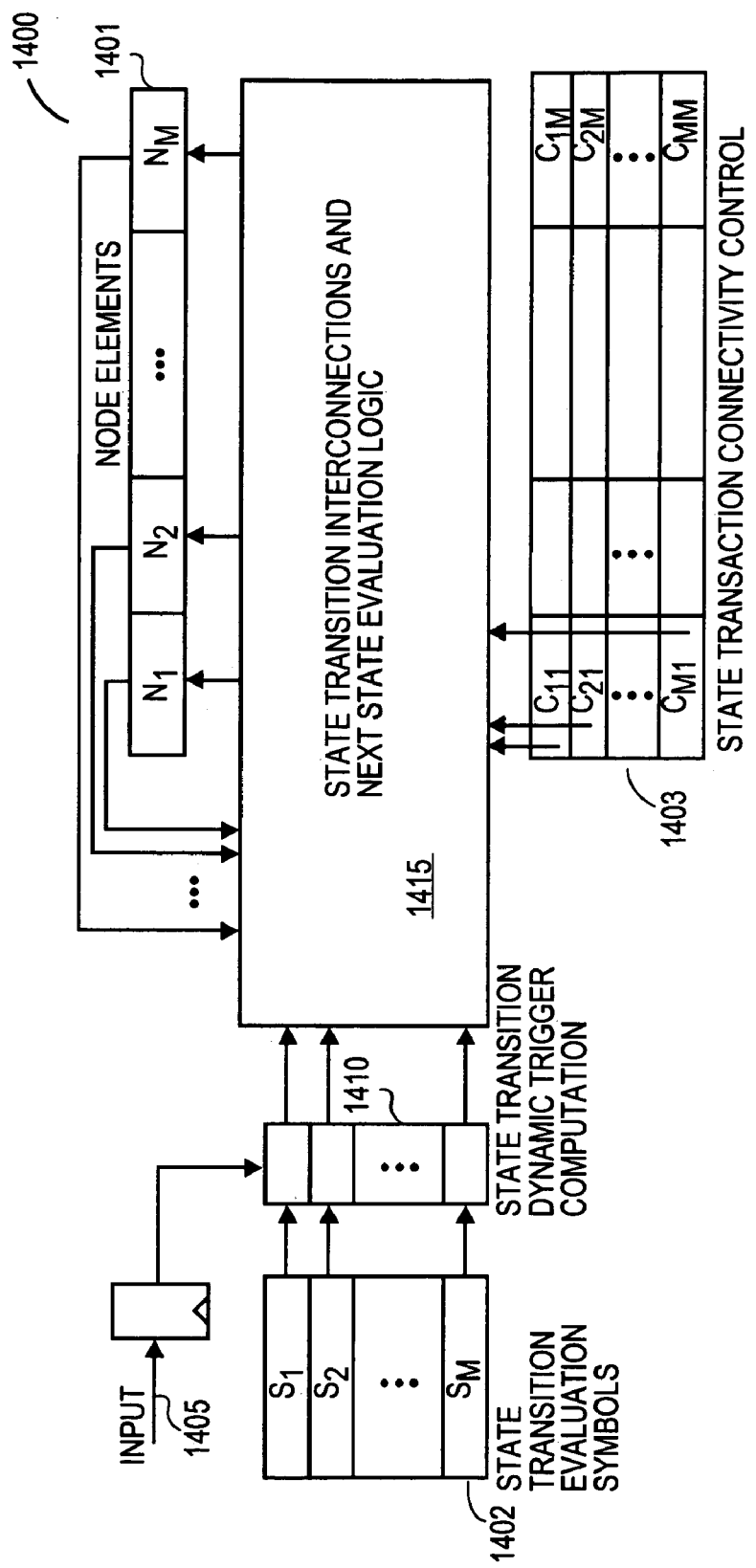
FIG. 14 illustrates a basic state machine evaluation building block or finite state automata building block (FSA building block) from a programming perspective in accordance with one embodiment of the invention.

FIG. 14 illustrates a basic state machine evaluation building block or finite state automata building block (FSA building block) from a programming perspective in accordance with one embodiment of the invention. FSA building block 1400, shown in FIG. 14 includes a number of registers that allow the FSA building block to be fully programmable. Register 1401 contains node elements that specify the current state of the FSA. Register 1402 contains state transition evaluation symbols on which match a state will be transitioned. Register 1403 contains a state transition connectivity control matrix that specifies which states of the FSA are connected (i.e., the enabled state connections).

Initially, the nodes are in a certain state. With each evaluation cycle, an input (e.g., an input byte) 1405 is input to the state transition dynamic trigger computation 1410, which compares the input to the state transition evaluation symbols contained in register 1402. The comparison information is input to the state transition interconnections and next state evaluation logic 1415. Then, based on the nodal connections contained in register 1403, the next state is computed and latched and then becomes the current state. That is, the next states are calculated using triggers, connectivity controls, and current state bits. The architecture of the FSA building block allows a character of input data to be analyzed every clock cycle without the need for external memory.

Figure 15:
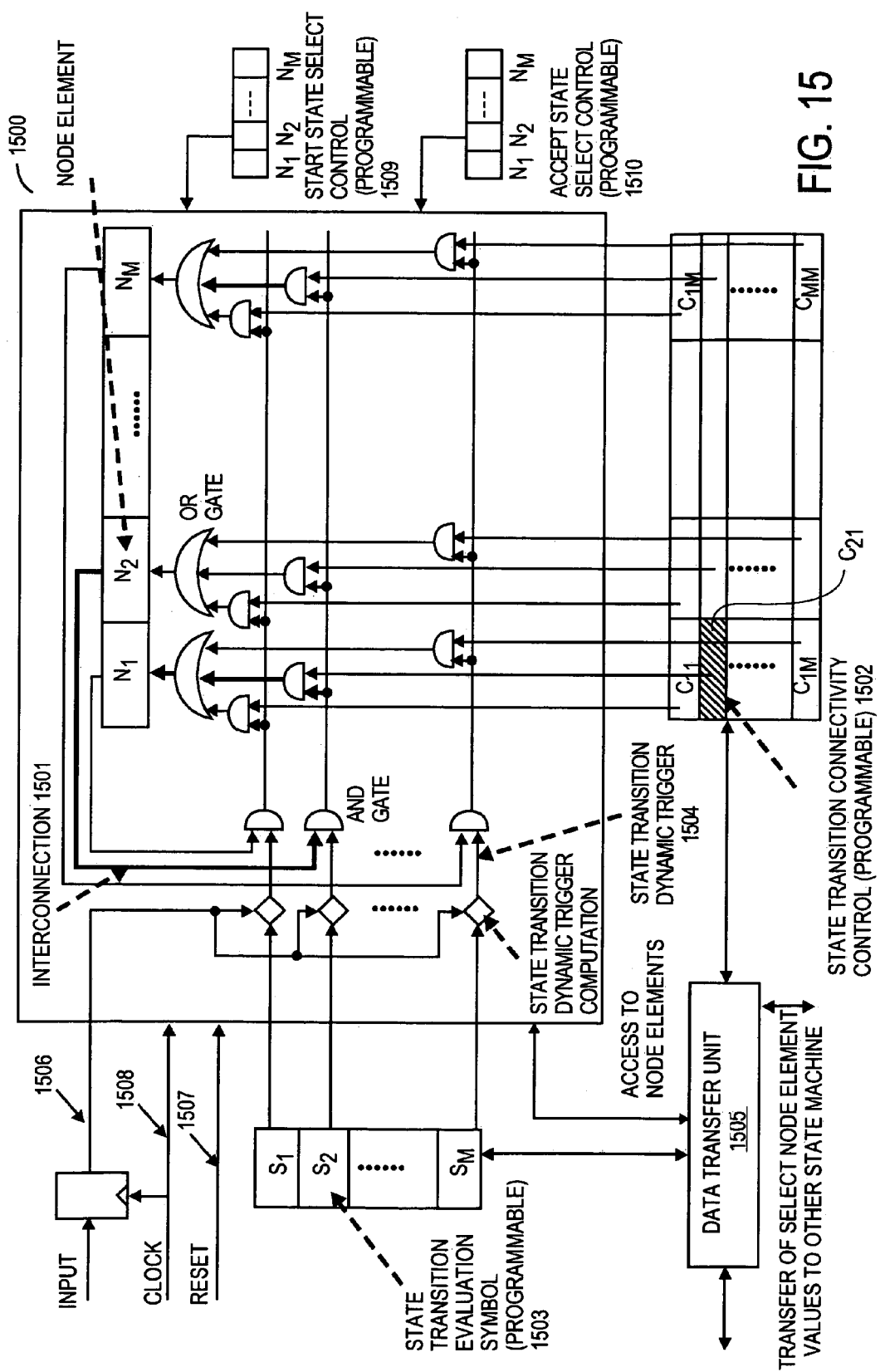
FIG. 15 illustrates a logic circuit for implementing an FSA building block in accordance with one embodiment of the invention.

FIG. 15 illustrates a logic circuit for implementing an FSA building block in accordance with one embodiment of the invention. The logic circuit 1500, shown in FIG. 15, may be used to implement a state machine architecture for realization of a non-deterministic finite state automata with R nodes, R symbols, and $R^2$ arcs. In FIG. 15, R has been set to a variable M, and the hardware organization is designed and laid out to be scalable for any M. By fixing the value of M and providing the appropriate level of hardware, an FSA building block with specifically M instantiated nodes can be realized.

The node elements $N_1$-$N_M$ are fully connected with interconnections 1501. Each node element has an arc or interconnection to itself, as well as to each of the other node elements. Hence, for M=32, there are 32×32 or 1024 interconnections 1501. Likewise, for M=16, there are 16×16 or 256 interconnections 1501.

For M=32, the state transition connectivity controls 1502 comprise 1024 bits organized as a matrix of 32 bits×32 bits. Likewise, for M=16, the state transition connectivity controls 1502 comprise 256 bits organized as a matrix of 16 bits×16 bits. A bit in row Y and column Z represents the control to enable or disable an interconnection between node element $N_Y$ and node element $N_Z$. The mechanism by which the interconnections 1501 between node elements $N_1$-$N_M$ can be enabled or disabled by the state transition connectivity controls 1502 is embodied as a switch on the interconnection (e.g., wire) 1501, with the switch being gated by the relevant control bit for that interconnection. This could be implemented using AND gate logic as well.

In this embodiment, there are as many state transition evaluation symbols 1503 as there are states in the machine. For M=32, there are 32 symbols. For M=16, there are 16 symbols. Each symbol could comprise a single 8-bit character value and compare operator, so that input data is specified for comparison to the 8-bit character value to compute the state transition dynamic trigger 1504. In this embodiment, the logic for the state transition dynamic trigger 1504 computation is as follows. A fresh byte of input data is fed simultaneously to all M comparators. A set of M match lines act as state transition dynamic triggers 1504. Once again, M may be either 16 or 32.

The mechanism by which the state transition dynamic triggers 1504 govern the update and transfer of values between node elements $N_1$-$N_M$ (over interconnections 1501 that have been enabled) is implemented in this embodiment as simple AND gate logic. That is, AND gates in cooperation with OR gates act to enable and/or disable interconnections 1501.

The data transfer unit 1505 dynamically configures and programs the state transition connectivity controls 1502 and the state transition evaluation symbols 1503. This enables dynamic realization of a range of control flow graph structures or configurations. In this embodiment, for M=32, the bit matrix for the state transition connectivity controls 1502 can be implemented as 32 registers of 32 bits each. Likewise, for M=16, the bit matrix for the state transition connectivity controls 1502 can be implemented as 16 registers of 16 bits each. In this embodiment, for M=32, the storage for the state transition evaluation symbols 1503 can be implemented as 32 registers of 8 bits each. Likewise, for M=16, the storage for the state transition evaluation symbols 1503 can be implemented as 16 registers of 8 bits each.

The data transfer unit 1505 also provides access to read and write the node elements $N_1$-$N_M$. For M=32, the node elements could be viewed as a logical register of 32 bits. Likewise, for M=16, the node elements could be viewed as a logical register of 16 bits. The data transfer unit 1505 executes load and store operations to read and write values from and into all these registers. This ability to read and write the node elements $N_1$-$N_M$ can be used to enable the data transfer unit 1505 to communicate with an external interconnect fabric to connect the state machine building block to other such building blocks, in order to construct larger state machines or graphs. The data transfer unit 1505 outputs values from selected node elements on dedicated signal wires, which can be sent to, for example, other state machines (e.g., another FSA building block) or an external interconnect fabric. Likewise, it receives values from the external interconnect fabric on dedicated signal wires. These values can be transferred into selected node elements.

A single reset signal 1507 is fed to various elements of the apparatus to clear values to zero.

Before the start of the state machine evaluation, the state transition connectivity controls 1502 and the state transition evaluation symbols 1503 should have been programmed with desired configuration values. Hence, the signal values in the storage assigned for these controls will be stable before the state machine evaluation begins.

In one embodiment, there is a mechanism to control the start of the state machine evaluation. In one embodiment, for M=32, the start state select controls 1509 consist of a register of 32 bits. In one embodiment, for M=16, the start state select controls 1509 consist of a register of 16 bits. Each bit in this register corresponds to a node element. Any number of bits in this register could be set to 1 (active). Upon initialization of the state machine, node elements that correspond to active bits in the start state select controls 1509 register will start as active states.

In one embodiment, the progress of the state machine evaluation is conditioned by a clock 1508 that determines an evaluation cycle. In one embodiment, every evaluation cycle, a fresh byte of input data is presented to the apparatus, and this byte is evaluated in parallel against all state transition evaluation symbols (in this embodiment, this is a comparison of the input byte versus the 8-bit character value), leading to an update of set of M match lines representing the state transition dynamic triggers 1504. These M triggers 1504, along with the $M^2$ bits corresponding to the state transition connectivity controls 1502, combine with the current state values in the node elements $N_1$-$N_M$ to compute the next state value for each node element. The logic equation for the computation of the next state of each node element is as follows:

If the state transition dynamic triggers are $T_1$ to $T_M$

If node elements are $N_1$ to $N_M$

If state transition connectivity controls are a bit matrix $C_{I,J}$ with I=1,M, and J=1,M Then, given previous state $PS_K$ for node element $N_K$, the next state $NS_K$ is as follows:

$$NS_K = OR\ (\ [PS_1\ AND\ T_1\ AND\ C_{1,K}],\ [PS_2\ AND\ T_2\ AND\ C_{2,K}],\ ...\ ...\ [PS_I\ AND\ T_I\ AND\ C_{I,K}],\ ...\ ...\ [PS_M\ AND\ T_M\ AND\ C_{M,K}]\ )$$

Effectively, for each node element, the next state computation is a large OR function of M terms. Each term is computed by ANDing together 3 values—the previous state value of a node element, the corresponding dynamic trigger, and the corresponding connectivity control bit that indicates whether that particular interconnection 1501 is enabled.

Once the next state computation is complete, the node elements are updated with the next state values, and the state machine completes a single evaluation cycle. As can be seen by the logic equations for the next state computation, the evaluation cycle time for the apparatus is three levels of logic evaluation. The first level comprises of AND gates to compute the triggers, the second level comprises of AND gates to factor in the connectivity controls, and finally an M-input OR gate. This evaluation cycle time is considerably shorter than the cycle time that governs the operating frequency of commercial microprocessors.

Note that the sequence of steps described above represents the computation needed in a single logical evaluation cycle. Physically speaking, additional pipelining is possible, to further boost the frequency of operations. For example, the computation of the state transition dynamic triggers (given a fresh byte of input data) can be decoupled from the next state evaluation.

In one embodiment, there is a mechanism to control the halting of the state machine evaluation. For M=32, the accept state select controls 1510 consist of a register of 32 bits. For M=16, the accept state select controls 1510 consist of a register of 16 bits. Each bit in this register corresponds to a node element. Any number of bits in this register could be set to 1 (active). Once the state machine enters into any of these states (corresponding node element goes active), the state machine halts its evaluation.

The foregoing provided a description of the evaluation cycle for a single FSA building block. When such an FSA building block is coupled to other state machines (e.g., another FSA building block) via the external interconnect fabric, an additional synchronization handshake would be incurred to enable the respective evaluation cycles to be coordinated.

The basic FSA building block, as described above, may be implemented in various ways. The remainder of the detailed description will discuss specific embodiments that address a number of concerns.

As discussed above, embodiments of the invention provide a fixed-size FSA building block (i.e., an FSA building block having a fixed number of states) to facilitate efficient implementation. In alternative embodiments, FSA building blocks of various sizes may be implemented. However, a regular, repeatable structure of a fixed size FSA building block allows for efficient implementation of a large number (e.g., 1000) of FSA building blocks on a chip.

The fixed size FSA building block, while easier to implement, raises the issue of how to address REs having a number of states greater than the fixed size of the FSA building block. For one embodiment of the invention, a fixed size for the FSA building block is determined based upon the particular problem space, and two or more FSA building blocks are connected (stitched) to accommodate REs having a greater number of states.

For one embodiment, the stitching of FSA building blocks to solve REs having an excessive number of states is accomplished as follows. The RE is converted into a syntax tree. The syntax tree is then split into a number of sub-trees, each having a number of characters that is no greater than the fixed size of the FSA building block. This division of the syntax tree may be effected using a number of well-known algorithms. Each sub-tree is then converted to an NFA having a number of states that can be accommodated by the fixed size FSA building blocks. The NFA for each sub-tree is then implemented on a separate FSA building block and each of the separate FSA building blocks are then stitched together to effect evaluation of the RE.

Depending upon the size of the REs in the problem space, a number of the FSA building blocks may be grouped together. For example, for a fixed size FSA building block of 16 states, grouping 16 FSA building blocks together would accommodate an RE having 256 states. For one embodiment of the invention, the approximately 1000 FSA building blocks on a chip are divided into groups of 16 FSA building blocks each. By interconnecting each FSA building block with all FSA building blocks within its group, clock penalties for cross-group transitions are avoided.

For one embodiment, each group of FSA building blocks is not interconnected with every group, rather the groups are cascaded with some groups "triggering" one or more particular other groups. For one embodiment, where such architecture is unable to accommodate an excessively large RE, a controller is employed to read the state of the FSA building block(s) and explicitly write the transitions states.

As described above, an RE may be too large to be solved by a single FSA building block. By the same token, occasionally REs are smaller than the fixed size of the FSA building block. For one embodiment, two or more REs are solved using a single FSA building block as described below.

For one embodiment, the number of REs that can be solved is not limited by the number of REs instantiated within the FSA building blocks. For one embodiment, REs can be loaded to the FSA building blocks from a rule memory (e.g., conventional memory), that can store many more RE's than are implemented in hardware. Coupling the FSA building blocks to a rule memory allows REs to be stored in memory and used to dynamically program the FSA building blocks.

Occasionally, the input data to an FSA building block is fragmented, that is, a first portion of the input data is followed immediately by unrelated data, which is followed subsequently by the remaining portion of the input data. To address this situation, one embodiment of the invention provides the capability of storing a partial context to a context memory and accessing the partial context at the appropriate time.

For one embodiment of the invention, the FSA building blocks include counters, pointers, and status registers to provide additional information (e.g., beyond whether or not a pattern has been discerned). For example, a counter may be used to indicate the number of times a particular RE matched or to implement more complex REs; a pointer may be used to indicate the start and end locations of an RE match; and status bits may be used to indicate various occurrences during an RE search.

System

Figure 16A:
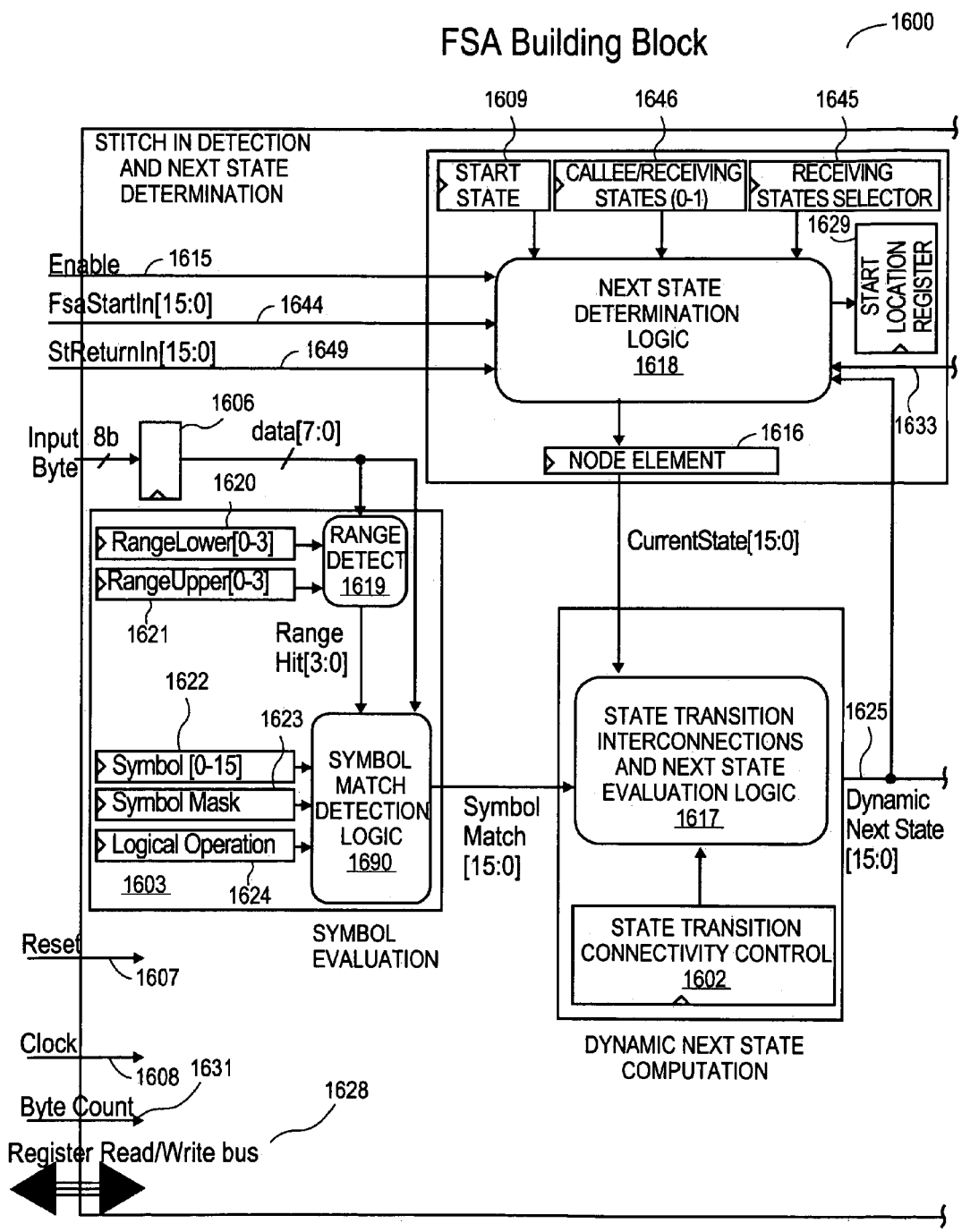
FIGS. 16A and 16B illustrate an FSA building block in which a number of features have been implemented to provide additional functionality in accordance with one embodiment of the invention.
Figure 16B:
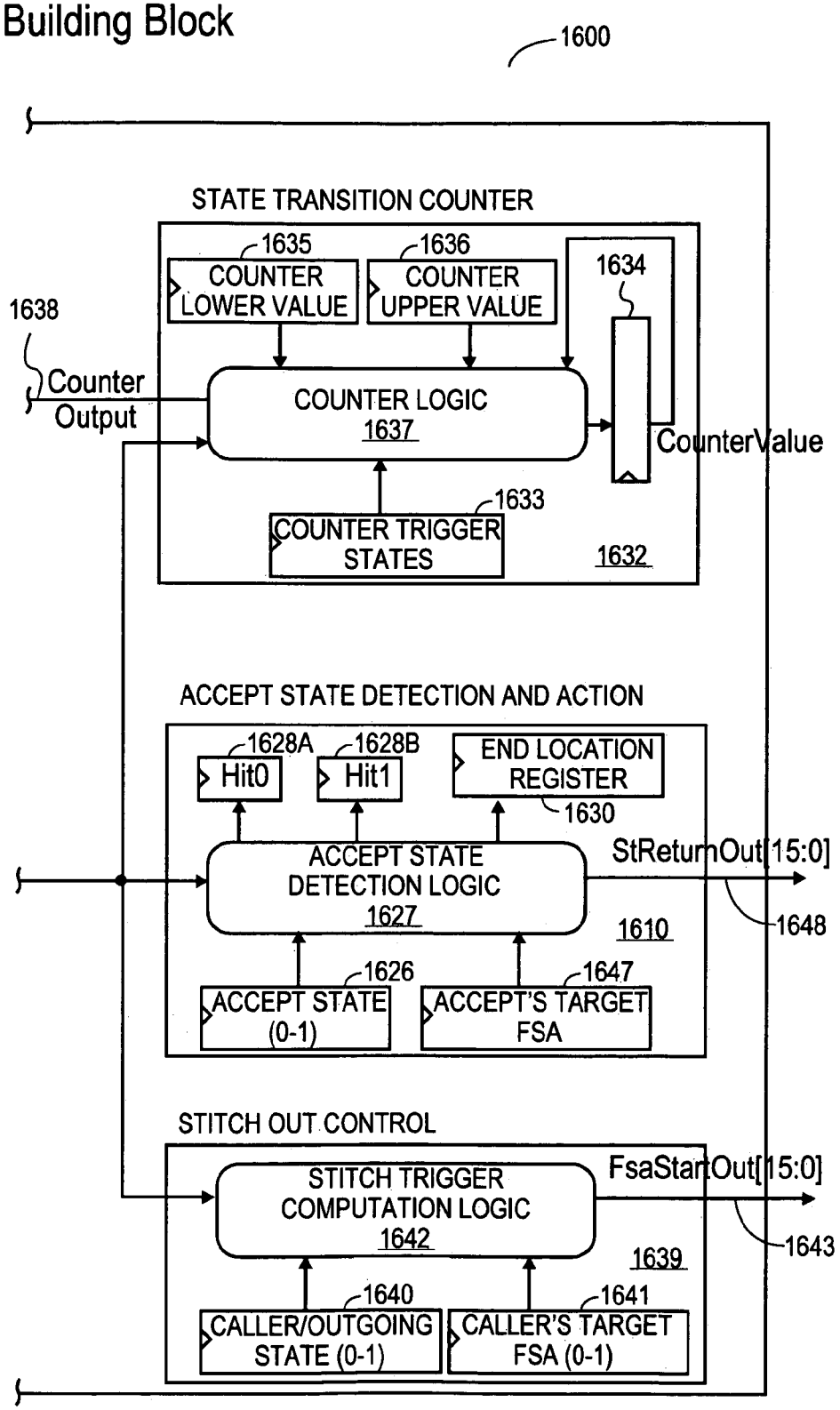

FIGS. 16A and 16B illustrate an FSA building block in which a number of features have been implemented to provide additional functionality in accordance with one embodiment of the invention. FSA building block 1600 shown in FIGS. 16A and 16B is a 16-state FSA building block. FSA building block 1600 includes an enable signal 1615 that is driven by an externally programmed start offset/end offset register. That is, when receiving an input data stream, it is not necessary to commence evaluation at the beginning of the stream.

The starting and ending points of the evaluation can be determined and programmed to drive the enable signal 1615 of FSA building block 1600. A clock signal 1608 controls the evaluation process and a reset signal 1607 resets the FSA building block (i.e., sets all node elements 1616 to zero). A start state register 1609 is programmed via software to indicate which of the 16 states are initially active. When the initial clock signal 1608 is received, if the enable signal 1615 is high, the values contained in start state register 1609 are latched into node elements 1616. When an input byte 1606 is received, it is compared to the evaluation symbols of the symbol evaluation unit (SEU) 1603. The determination, as to whether or not the input byte is a match, is forwarded to the state transition interconnection and next state evaluation logic (STINSEL) 1617. Then upon a match, and based upon the nodal connections as programmed into the state transition connectivity control (STCC) register 1602, the dynamic next state (DNS) 1625 is enabled and used by the next state determination logic (NSDL) 1618 to determine the next state. The NSDL 1618 then latches the next state to the node elements 1616 at the end of the clock cycle. The latched value then becomes the current state of the FSA building block, the next input data byte is received, and the evaluation continues.

Symbol Evaluation Unit

In accordance with one embodiment of the invention, the SEU 1603 contains a number of registers and accompanying logic to allow for efficient evaluation of complex REs.

An RE may be defined to employ a range rather than a single character symbol. For example, the RE may reference a character in the range of a-z or 0-9. As shown in FIG. 16A, the SEU 1603 includes two range registers, namely rangelower register 1620 and rangeupper register 1621, to specify the lower range value and an upper range value, respectively, for multiple (e.g., up to four) ranges. The input byte 1606 and the upper and lower range values are provided to a range detection logic 1619 to determine if the input was within the specified range. This information, together with input byte 1606 and the programmed match symbol from symbol register 1622, is provided to the symbol match detection logic (SMDL) 1690 that evaluates the input byte 1606 against the symbol itself. This allows the software to program a state transition on a range, a character, or a combination thereof. This is accomplished by expanding the character definition (e.g., to include range information) and providing additional space for the character definition. For one embodiment, 16 symbol registers of 24 bits each are implemented, with 12 of the 24 bits used to define the extended character and 12 used for a bit-mask (discussed below). Of the 12 bits used for the extended character, 8 are used for the character itself, and four are used to specify whether the extended character has a range.

SEU 1603 includes a symbol mask register 1623 to indicate a particular bit or bits that is not to be compared. For some applications it may be more efficient to mask a bit of the input data (i.e., to program the evaluation logic such that a particular bit is not considered). For example, ASCII provides an 8-bit character to represent characters a-z (lower case) and A-Z (upper case), with the fifth bit specifying the case. If an RE employed a range of a-z and A-Z, it could be more efficiently implemented by ignoring the case (i.e., masking the fifth bit). That is, by masking the case bit (fifth bit) it would not be necessary to effect a comparison for lower case and a separate comparison for upper case, a single state can complete the comparison.

SEU 1603 includes a logical operation register 1624 that may be used to indicate state transition upon the occurrence of a matching symbol in conjunction with a logical operator. For example, an RE may be programmed such that transition occurs upon the negative polarity of the evaluation instead of the positive polarity of the evaluation (e.g., transition occurs on "NOT" match instead of match). For one such embodiment, the logical operation register provides 16 bits (i.e., one bit per state) to specify the logical operator "NOT".

Accept State Detection Unit

When the DNS 1625 is enabled, the next state is checked to determine if an accept state has been reached. Accept state detection unit 1610 includes accept state registers 1626 and accept state detection logic (ASDL) 1627. The accept state registers 1626 are programmed with accept states. The ASDL 1627 used the DNS 1625 to determine if the programmed accept state has been reached, and if so, a hit is recorded in hit register 1628a corresponding to the accept state register 1626. The hit register, then, records the number of hits, this information can be made available externally via register read/write bus 1628. In accordance with one embodiment of the invention, the ASDU 1610 includes two accept state registers 1626 to facilitate the packing of two REs into a single FSA building block. As described above, two or more REs having a total number of states not greater than the fixed number of states of the FSA building block may be packed into a single FSA building block. Each RE may have unique accept states, and therefore an accept state register should be implemented on the FSA building block for each packed RE. Because each RE may reach accept states separately, a corresponding hit register should be implemented for each accept state register. For the embodiment shown in FIG. 16B, two accept state registers 1626 are implemented along with corresponding hit registers 1628a and 1628b. To maintain flexibility, each register is a full 16-bit register, which allows packing REs of various sizes. For example, a 12-state RE may be packed with a 4-state RE, or in the extreme a 15-state RE could be packed with a 1-state RE. If the particular FSA building block is not being packed, the additional accept state register and corresponding hit register are not used.

Match Location Pointer

For some applications, it is useful to determine the location at which a match begins and ends. To effect such determination, a start location register 1629 and an end location register 1630, as well as a byte count 1631, are implemented in the FSA building block in accordance with one embodiment. When the evaluation starts, a byte count 1631 is provided, when a transition of the next state occurs (e.g., a match is initiated), the value of the byte count at that point is latched to the start location register 1629. When, subsequently, the DNS 1625 is enabled, a determination is made as to whether an accept state is reached (e.g., a match is determined), the value of the byte count 1631 at that point is latched to the end location register 1630, thus providing start and end locations for the match.

State Transition Counter Unit

The FSA building block 1600 includes a state transition counter unit (STCU) 1632 that contains a number of registers and accompanying logic to allow for efficient evaluation of complex REs. For example, the counter allows an RE to be programmed that employs state transitions not just upon receipt of a specified symbol, but upon receipt of the specified symbol a specified number of times. So, for example, an RE may be programmed as a b {2, 4} c, which indicates a match when "a" is received followed by the occurrence of "b" from two to four times, followed by "c" (i.e., abbc, abbbc, and abbbbc). A counter trigger state (CTS) register 1633 can be programmed with a trigger state (e.g., state 1, the state corresponding to "b") for the counter 1634. For this example, the CTS register 1633 is programmed to state 1, the counter lower value (CLV) register 1635 is programmed to 2 (i.e., the minimum number of occurrences for a match), and the counter upper value (CUV) register 1636 is programmed to 4 (i.e., the maximum number of occurrences for a match). The programmed values of the CTS 1633, the CLV 1635, and the CUV 1636, together with the value of the counter 1634, are input to the counter logic 1637. When the conditions of the RE are satisfied, the counter logic output 1638 will be activated. The transition from one state to the next is controlled by the counter logic output 1638, so no transition will occur until the counter logic output is high.

For one embodiment the CTS register 1633 can be programmed with multiple trigger states to effect more complex REs. For example, an RE programmed as a (b|c) {2, 4} would require programming the states corresponding to "b" and "c" (i.e., states 1 and 2) as trigger states.

For one embodiment, the trigger state of CTS 1633 can be programmed to an accept state of the RE to count the number of times the RE has hit.

To effect stitching, the FSA building block 1600 includes a stitch out control unit (SOCU) 1639 with two caller outgoing state (COS) registers 1640 and two corresponding caller's target FSA (CTF) registers 1641. Each COS register is programmed with the states at which to stitch to another FSA building block. The corresponding CTF registers 1641 indicate which FSA building blocks to stitch to (i.e., the callee FSA building blocks). The stitch trigger computation logic (STCL) 1642 receives the stitch state information and the target FSA building block information from the COS registers 1640 and the corresponding CTF registers 1641, respectively, and uses the information to activate FSA startout 1643. FSA startout 1643 is connected to, and activates, the FSA startin 1644 of the callee FSA building blocks. At the callee FSA building blocks, the receiving states selector (RSS) 1645 is programmed to determine which of the callee receiving state (CRS) registers 1646 to access for the callee receiving states. The NSDL 1618 then uses the value in the selected CRS register 1646, the start state 1609, and the DNS 1625 to determine the next state for the callee FSA building block, which is then latched to the node elements 1616. For one embodiment the values in the selected CRS register(s) 1646, the start state 1609, and the DNS 1625 are OR'd to determine the next state.

Similarly, when the callee FSA building block reaches an accept state contained in an accept state register 1626, it determines which FSA building block to return to by reference to the accept's target FSA (ATF) register 1647. The ASDL 1627 uses the value in the accept state register 1626 and the value in the ATF register 1647 to determine when to activate stitch return out (SRO) 1648. SRO 1648 is connected to, and activates, the stitch return in (SRI) 1649 of the target FSA building blocks, and the evaluation continues at the target FSA building blocks.

FSA building blocks may be interconnected to provide FSA building block stitching in accordance with on embodiment of the invention. Each FSA building block may be connected to itself via n internal connection.

Figure 17:
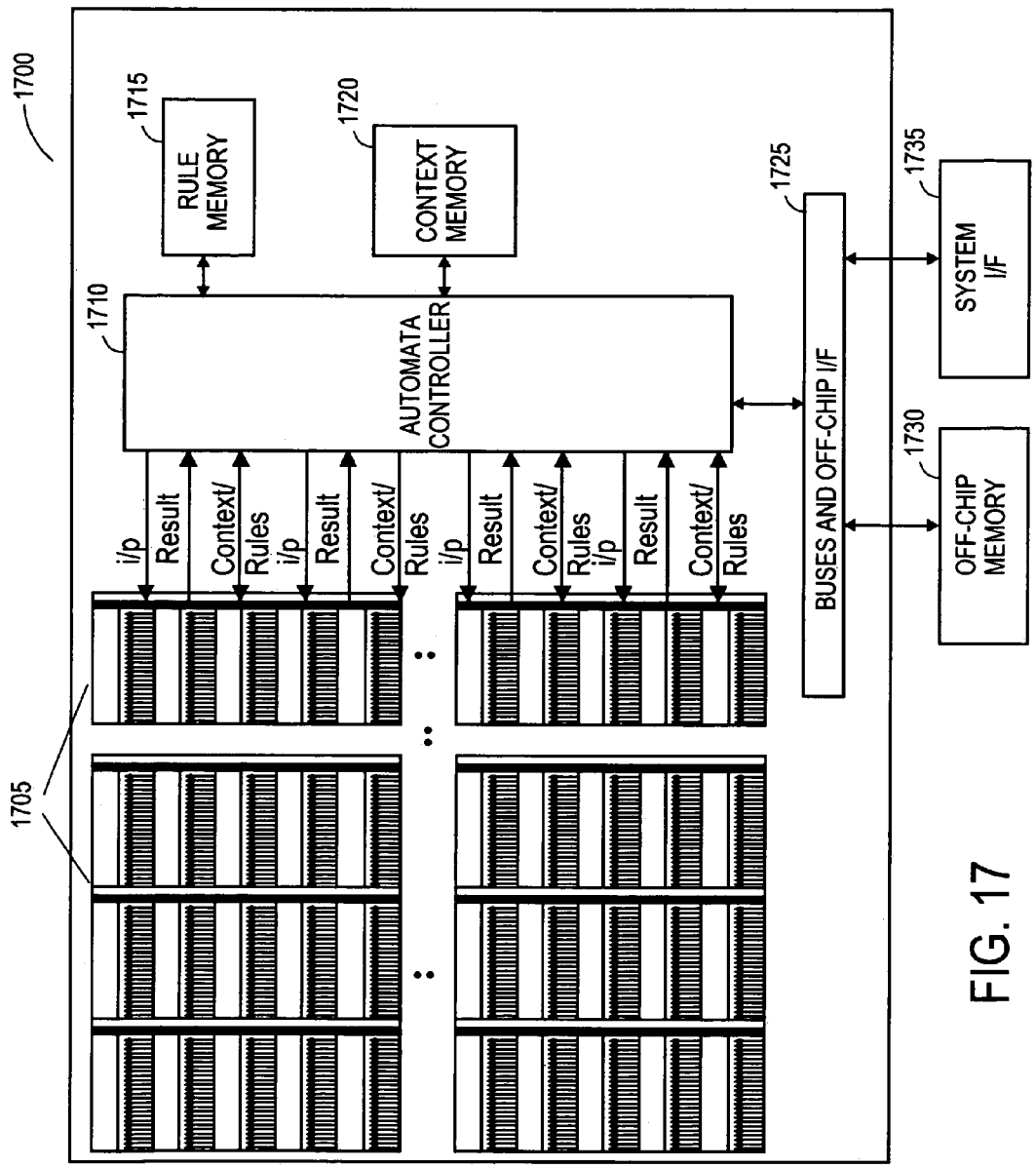
FIG. 17 illustrates an on-chip state machine unit, referred to as a RE processor, in accordance with one embodiment of the invention.

FIG. 17 illustrates an on-chip state machine unit, referred to as a RE processor, in accordance with one embodiment of the invention. RE processor 1700, shown in FIG. 17, includes a number of FSA building blocks 1705, that may be interconnected in groups as described above. For one embodiment, the number of FSA building blocks 1705 may be approximately 1000-2000. RE processor 1700 also includes an automata controller 1710 that provides input data to the FSA building blocks 1705. Automata controller 1710 couples the FSA building blocks 1705 to a rule memory 1715 and a context memory 1720, as well as to an on-chip bus and interface 1725, for communication with off-chip memory 1730 and with other system devices through an off-chip interface 1735.

Context Memory

As discussed above, if the input data is fragmented, then the state (context) of the FSA building block should be saved in order to resume appropriate evaluation when the input data resumes. The context of the FSA building block includes the node element values, the counter values, and potentially, the location registers. Upon resuming the input data, the saved context memory is loaded to the FSA building block so that the evaluation may continue. In accordance with one embodiment, upon interruption of the input data, the automata controller 1710, which is capable or reading from, and writing to, the FSA building block, reads the context from the appropriate registers of the FSA building block, and stores the context, on-chip, in context memory 1720. Upon resumption of the input data, the automata controller 1710 loads the context from context memory 1720 to the FSA building block. The amount of context data is small relative to the programmed registers of the FSA building block. Therefore, by implementing an on-chip context memory, it is possible to efficiently handle multiple concurrent fragmented RE evaluations.

Rules Memory

Initially, the FSA building blocks are programmed with rules that define the relevant REs. Without more, the FSA building blocks could evaluate only those particular REs. However, applications frequently contain more REs than can be practically implemented as FSA building blocks. Embodiments of the invention provide FSA building blocks that are fully programmable and reprogrammable. For one embodiment, additional rules are stored in rule memory 1715. The automata controller 1710 moves rules from the rule memory 1715 into the appropriate FSA building block and vice versa. That is, based upon an externally provided instruction, the automata controller 1710 reprograms particular FSA building blocks with rules stored in rule memory 1715. Storing the additional rules on-chip allows for the rapid reprogramming of the FSA building blocks. The amount of rules that can be practically stored on-chip is at least several times the amount of rules implemented in the on-chip FSA building blocks.

The interconnection of FSA building blocks in groups allows for the context and rule information to be written to, or read from, the FSA building blocks in parallel. Such interconnection also allows for increasing throughput by concurrently evaluating multiple data input streams. For example, if an application requires only a portion of the available FSA building blocks, then the relevant rules may be loaded repeatedly into the available FSA building blocks and the REs evaluated through multiple data input streams.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

We claim:

1. A programmable rule processor comprising:
   a general purpose register file;
   an instruction sequencer to provide instructions;
   a decoder coupled to the general purpose register file and instruction sequencer to decode a set of instructions specified by the instruction sequencer; and
   a state machine unit coupled to the decoder and the general purpose register file and having a plurality of state machine register sets to store the states of a plurality of state machines and a plurality of state machine execution hardware units coupled to the plurality of state machine register sets to evaluate the plurality of state machines in parallel, wherein each state machine register set is coupled to a state machine execution hardware unit, so that each state machine unit could respond in parallel to executing one or more of the decoded set of instructions and on independent information from one or both of the decoder and the general purpose register file.

2. The programmable rule processor defined in claim 1 wherein the state machines being evaluated are finite state automata to detect regular expressions on input data.

3. A programmable rule processor comprising:
   a general purpose register file;
   an instruction sequencer to provide instructions;
   a decoder coupled to the general purpose register file and instruction sequencer to decode a set of instructions specified by the instruction sequencer;
   search registers and search execution hardware coupled to the plurality of search registers and the search execution hardware coupled to the decoder and the general purpose register file to receive search parameters from one or both of the decoder and the general purpose register file, wherein the search execution hardware is configured to perform one or more contextual searches on content in the search registers in response to executing one or more of the decoded set of instructions; and
   a state machine unit coupled to the decoder and having state machine registers to store the states of one or more state machines and state machine execution hardware coupled to the state machine registers, the decoder, and the general purpose register file, to evaluate the one or more state machines in response to executing one or more of the decoded set of instructions and based on information from one or both of the decoder and the general purpose register file.

4. The processor defined in claim 3 wherein the search execution hardware and state machine unit are coupled together, so that either results from performing one or more contextual searches on content in the search registers by the search execution hardware are subsequently used by the state machine unit in evaluating at least one state machine or results from evaluation of the one or more state machines are subsequently used by the search execution hardware in performing at least one contextual search on content in the search registers.

5. The processor defined in claim 3, further comprising a data generator coupled to the plurality of search registers, so that the data generator could load content data into the search registers in a replicated manner, so that the search execution hardware performs at least one of the one or more contextual searches on content in the search registers via parallel pattern matching in response to executing one or more decoded search instructions specifying the one or more pattern searches and presenting one or more patterns to the content in the search registers.

6. The rule processor defined in claim 5 wherein the search execution hardware comprises:
   a search array coupled to the plurality of search registers, wherein content in the plurality of search registers is replicated and stored in the search array; and
   a sorter coupled to the search array to perform the one or more operations in response to information specified by one or more search instructions.

7. The processor defined in claim 3 wherein the state machine execution hardware comprises a state machine evaluation unit.

8. The rule processor defined in claim 3 further comprising an instruction memory coupled to the decoder, which is coupled to both the search registers and the state machine units to store the one or more decoded search instructions to either be applied to data in the search registers or to be applied to and evaluated by the state machine execution hardware.

9. The rule processor defined in claim 3 further comprising an instruction sequencer for applying one or more search instructions to the search execution engine and the state machine execution hardware.

10. The rule processor defined in claim 3 wherein at least one search instruction includes a field that specifies a parameter to use to control the search or a pointer into a memory that stores the parameter to control the search.

11. The rule processor defined in claim 10 wherein the pointer points to a general purpose register.

12. The programmable rule processor defined in claim 3 wherein state machines being evaluated are finite state automata to detect regular expressions on input data.

13. The rule processor defined in claim 3 wherein at least one of the one or more search instructions specifies a pattern that is to be searched against the content in the plurality of search registers and zero or more search parameters.

14. The rule processor defined in claim 13 wherein one parameter specifies a portion of the pattern to be masked to enable a subset of the pattern to be searched against the content in the search registers.

15. The rule processor defined in claim 14 wherein the portion of the pattern to be masked is specified by a mask vector to mask off specific bytes in the pattern.

16. The rule processor defined in claim 14 wherein the zero or more parameters specify starting and ending locations that constitute a range of the content within the search registers within which the search execution engine is to constrain a search.

17. The rule processor defined in claim 3 wherein the one or more search instructions specify at least one pattern, range control, and program control flow.

18. A programmable rule processor comprising:
   a general purpose register file;
   a plurality of search registers;
   a plurality of state machine registers;
   a plurality of execution units;
   an instruction sequencer to provide instructions;
   a decoder coupled to the general purpose register file, the plurality of search registers, the plurality of state machine registers, and the plurality of execution units, to decode a set of instructions specified by the instruction sequencer and provide the decoded instructions to one or more execution units and one or more of the plurality of search registers and plurality of state machine registers for execution thereby based on an opcode in each instruction in the set of instructions; and
   a plurality of state machines coupled to the decoder and the general purpose register file and having a plurality of state machine register sets to store the states of a plurality of state machines and a plurality of state machine execution hardware units coupled to the plurality of state machine register sets to evaluate the plurality of state machines in parallel, wherein each state machine register set is coupled to a state machine execution hardware unit, so that each state machine unit could respond in parallel to executing one or more of the decoded set of instructions and on independent information from one or both of the decoder and the general purpose register file.

19. The processor defined in claim 18 wherein one of the plurality of execution units comprises a state machine evaluation unit.

20. The programmable rule processor defined in claim 18 wherein at least one of the execution units evaluates state machines represented by data in the state machine registers.

21. The programmable rule processor defined in claim 20 wherein the state machines being evaluated are finite state automata to detect regular expressions on input data.

22. The processor defined in claim 18 wherein one of the plurality of execution units comprises a sort array.

23. The processor defined in claim 18 wherein two of the execution unit comprise a state machine evaluation unit and search execution hardware, and further wherein either results from processing data by the search execution hardware are subsequently used by the state machine evaluation unit in evaluating at least one state machine or results from evaluation of the one or more state machines are subsequently used the search execution hardware in performing at least one search.

24. The processor defined in claim 18 further comprising a branch unit to branch to another set of one or more instructions based on results of data processing involving one or more of the state machine registers and the search registers.

25. A process for performing contextual searches using a rule processor, the process comprising:
   fetching a first rule from a memory on the rule processor;
   decoding the first rule to identify whether search parameters are located in the first rule or a general purpose register file in the rule processor;
   executing one or more search operations on values in a plurality of search registers in the rule processor using the search parameters obtained from either or both of the first rule and the general purpose register file, the plurality of search registers storing content therein;
   generating search results of executing the one or more search operations;
   fetching a second rule from the memory;
   evaluating one or more state machines with respect to data identified by the search results using state machine execution hardware in the rule processor according to parameters obtained from either or both of the first rule and the general purpose register file.

* * * * *